United States Patent

Yanagawa

(10) Patent No.: US 9,768,620 B2
(45) Date of Patent: Sep. 19, 2017

(54) WIRELESS POWER SUPPLY SYSTEM

(71) Applicant: CANON KABUSHIKI KAISHA, Tokyo (JP)

(72) Inventor: Katsuhiko Yanagawa, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 362 days.

(21) Appl. No.: 14/569,274

(22) Filed: Dec. 12, 2014

(65) Prior Publication Data

US 2015/0187491 A1 Jul. 2, 2015

(30) Foreign Application Priority Data

Dec. 27, 2013 (JP) .................. 2013-273071

(51) Int. Cl.
| | |
|---|---|
| H01F 38/14 | (2006.01) |
| H02J 5/00 | (2016.01) |
| H02J 1/14 | (2006.01) |
| H02J 7/02 | (2016.01) |

(52) U.S. Cl.
CPC ............... *H02J 5/005* (2013.01); *H02J 1/14* (2013.01); *H02J 7/025* (2013.01)

(58) Field of Classification Search
None
See application file for complete search history.

(56) References Cited

U.S. PATENT DOCUMENTS

| | | | |
|---|---|---|---|
| 2009/0140690 A1 | 6/2009 | Jung | |
| 2010/0328044 A1* | 12/2010 | Waffenschmidt | H02J 7/025 340/10.4 |
| 2012/0049642 A1* | 3/2012 | Kim | H02J 5/005 307/104 |
| 2013/0082652 A1* | 4/2013 | Jung | H02J 7/0004 320/108 |
| 2014/0266031 A1* | 9/2014 | Sasaki | H01F 38/14 320/108 |

FOREIGN PATENT DOCUMENTS

JP 2009-136132 A 6/2009

* cited by examiner

*Primary Examiner* — Jared Fureman
*Assistant Examiner* — Aqeel Bukhari
(74) *Attorney, Agent, or Firm* — Fitzpatrick, Cella, Harper & Scinto

(57) ABSTRACT

In a wireless power supply system, a power transmitting apparatus wirelessly supplies power to an assigned power receiving apparatus. The wireless power supply system includes an assigning unit that assigns the power receiving apparatus to the power transmitting apparatus, and a determining unit that, when the assigning unit assigns a particular power receiving apparatus to a plurality of power transmitting apparatuses, determines a power supply schedule such that the plurality of power transmitting apparatuses supply the power to the particular power receiving apparatus, not simultaneously.

8 Claims, 22 Drawing Sheets

| POWER SUPPLY MANAGEMENT TABLE | | | | | |
|---|---|---|---|---|---|
| ID | COMMUNICATING AREA | POWER SUPPLY AREA | MAXIMUM POWER SUPPLY | MASTER/ SLAVE | COMMUNICATING DEVICE | POWER SUPPLY DEVICE |
| BSM** | * m | * m | * kW | MASTER | DS**<br>DS | DS* |
| BSS** | * m | * m | * kW | SLAVE | DS**** | DS*** |

| TIME-SHARING POWER SUPPLYING SCHEDULE | | | | | | |
|---|---|---|---|---|---|---|
| ID/CYCLE<br>1 CYCLE PERIOD (SEC.) | T1<br>** | T2<br>** | T3<br>** | T4<br>** | T5<br>** | T6<br>** |
| BSM** | DS*** | DS*** | DS*** | DS*** | DS*** | DS*** |
| BSS** | DS*** | DS*** | DS*** | DS*** | DS*** | DS*** |

| MANAGEMENT TABLE OF ELECTRIC POWER RECEIVING | | | |
|---|---|---|---|
| ID | COMMUNICATION AREA | POWER SOURCE AREA | NECESSITY OF POWER SOURCE |
| DS*** | MASTER/SLAVE | NONE/MASTER/SLAVE | NECESSARY/UN-NECESSARY |
| DS*** | MASTER/SLAVE | NONE/MASTER/SLAVE | NECESSARY/UN-NECESSARY |
| DS*** | MASTER/SLAVE | NONE/MASTER/SLAVE | NECESSARY/UN-NECESSARY |
| DS*** | MASTER/SLAVE | NONE/MASTER/SLAVE | NECESSARY/UN-NECESSARY |

| MANAGEMENT TABLE OF POWER TRANSMITTING APPARATUS | | | | | | |
|---|---|---|---|---|---|---|
| ID | COMMUNICATION AREA | POWER SUPPLY AREA | MAXIMUM POWER SUPPLY | MASTER/ SLAVE | COMMUNICATION DEVICE | POWER SUPPLY DEVICE |
| BSM10 | 5 m | 3 m | 8 kW | MASTER | DSA20 DSB21 DSC22 | |
| BSS11 | 5 m | 3 m | 5 kW | SLAVE | DSC22 DSD23 | |

| MANAGEMENT TABLE OF POWER RECEIVING APPARATUS | | | |
|---|---|---|---|
| ID | COMMUNICATION AREA | POWER SUPPLY AREA | NECESSITY OF ELECTRIC POWER |
| DSA20 | MASTER | | |
| DSB21 | MASTER | | |
| DSC22 | MASTER/SLAVE | | |
| DSD23 | SLAVE | | |

| MANAGEMENT TABLE OF POWER RECEIVING APPARATUS | | | |
|---|---|---|---|
| ID | COMMUNICATION AREA | POWER SUPPLY AREA | NECESSITY OF ELECTRIC POWER |
| DSA20 | MASTER | NONE | |
| DSB21 | MASTER | MASTER | |
| DSC22 | MASTER/SLAVE | MASTER/SLAVE | |
| DSD23 | SLAVE | SLAVE | |

FIG. 10G

MANAGEMENT TABLE OF POWER RECEIVING APPARATUS 1203

| ID | COMMUNICATION AREA | POWER SUPPLY AREA | NECESSITY OF ELECTRIC POWER |
|---|---|---|---|
| DSA20 | MASTER | NONE | UN-NECESSARY |
| DSB21 | MASTER | MASTER | NECESSARY |
| DSC22 | MASTER/SLAVE | MASTER/SLAVE | NECESSARY |
| DSD23 | SLAVE | SLAVE | NECESSARY |

FIG. 10H

MANAGEMENT TABLE OF POWER TRANSMITTING APPARATUS 1201

| ID | COMMUNICATION AREA | POWER SUPPLY AREA | MAXIMUM POWER SUPPLY | MASTER/ SLAVE | COMMUNICATION DEVICE | POWER SUPPLY DEVICE |
|---|---|---|---|---|---|---|
| BSM10 | 5 m | 3 m | 8 kW | MASTER | DSA20 DSB21 DSC22 | DSB21 DSC22 |
| BSS11 | 5 m | 3 m | 5 kW | SLAVE | DSC22 DSD23 | DSC22 DSD23 |

| TIME-SHARING POWER SUPPLYING SCHEDULE | | | | | | |
|---|---|---|---|---|---|---|
| ID/CYCLE | T1 | T2 | T3 | T4 | T5 | T6 |
| 1 CYCLE TIME (SEC.) | | | | | | |
| BSM10 | DSB21 | DSB21 | DSB21 | DSC22 | DSC22 | DSC22 |
| BSS11 | | | | | | |

| TIME-SHARING POWER SUPPLY SCHEDULE | | | | | | |
|---|---|---|---|---|---|---|
| ID/CYCLE | T1 | T2 | T3 | T4 | T5 | T6 |
| 1 CYCLE TIME (SEC.) | | | | | | |
| BSM10 | DSB21 | DSB21 | DSB21 | DSC22 | DSC22 | DSC22 |
| BSS11 | DSC22 | DSC22 | DSC22 | | | |

| TIME-SHARING POWER SUPPLY SCHEDULE | | | | | | |
|---|---|---|---|---|---|---|
| ID/CYCLE | T1 | T2 | T3 | T4 | T5 | T6 |
| 1 CYCLE TIME (SEC.) | | | | | | |
| BSM10 | DSB21 | DSB21 | DSB21 | | | |
| BSS11 | DSC22 | DSC22 | DSC22 | DSC22 | DSC22 | DSC22 |
| | | | | DSD23 | DSD23 | DSD23 |

| TIME-SHARING POWER SUPPLY SCHEDULE | | | | | | |
|---|---|---|---|---|---|---|
| ID/CYCLE | T1 | T2 | T3 | T4 | T5 | T6 |
| 1 CYCLE TIME (SEC.) | 60 | 60 | 60 | 60 | 60 | 60 |
| BSM10 | DSB21 | DSB21 | DSB21 | | | |
| BSS11 | DSC22 | DSC22 | DSC22 | DSC22 | DSC22 | DSC22 |
| | | | | DSD23 | DSD23 | DSD23 |

| TIME-SHARING POWER SUPPLY SCHEDULE | | | | | | |
|---|---|---|---|---|---|---|
| ID/CYCLE | T1 | T2 | T3 | T4 | T5 | T6 |
| 1 CYCLE TIME (SEC.) | | | | | | |
| BSM10 | DSB21 | DSB21 | | | | |
| BSS11 | | | DSB21 | DSB21 | | |

| TIME-SHARING POWER SUPPLY SCHEDULE | | | | | | |
|---|---|---|---|---|---|---|
| ID/CYCLE | T1 | T2 | T3 | T4 | T5 | T6 |
| 1 CYCLE TIME (SEC.) | | | | | | |
| BSM10 | DSB21 | DSB21 | DSB21 | DSB21 | DSC22 | DSC22 |
| BSS11 | | | | | | |

| TIME-SHARING POWER SUPPLY SCHEDULE | | | | | | |
|---|---|---|---|---|---|---|
| ID/CYCLE | T1 | T2 | T3 | T4 | T5 | T6 |
| 1 CYCLE TIME (SEC.) | | | | | | |
| BSM10 | DSB21 | DSB21 | DSB21 | DSB21 | DSC22 | DSC22 |
| BSS11 | | DSC22 | DSC22 | | | |

| TIME-SHARING POWER SUPPLY SCHEDULE | | | | | | |
|---|---|---|---|---|---|---|
| ID/CYCLE | T1 | T2 | T3 | T4 | T5 | T6 |
| 1 CYCLE TIME (SEC.) | | | | | | |
| BSM10 | DSB21 | DSB21 | DSB21 | DSB21 | DSC22 | DSC22 |
| BSS11 | DSD23 | DSC22 | DSC22 | DSD23 | DSD23 | DSD23 |

FIG. 15E

| TIME-SHARING POWER SUPPLY SCHEDULE | | | | | | | |
|---|---|---|---|---|---|---|---|
| ID/CYCLE | T1 | T2 | T3 | T4 | T5 | T6 |
| 1 CYCLE TIME (SEC.) | 60 | 60 | 60 | 60 | 60 | 60 |
| BSM10 | DSB21 | DSC22 | DSB21 | DSB21 | DSC22 | DSC22 |
| BSS11 | DSD23 | | DSD23 | DSD23 | DSD23 | DSD23 |

1202

WIRELESS POWER SUPPLY SYSTEM

BACKGROUND OF THE INVENTION

Field of the Invention

The present invention relates to a wireless power supply system in which a power transmitting apparatus wirelessly supplies power to a power receiving apparatus assigned.

Description of the Related Art

Four systems are known as a system of supplying power contactlessly (wirelessly). Specifically, they are an electromagnetic induction system, a magnetic field resonance system, an electronic filed coupling system and a radio wave reception system. In recent years, among the four systems, the magnetic field resonance system capable of compatibly achieving sufficient power that can be transmitted and a long power transmitting distance is drawing attention. In the magnetic field resonance system, a one-to-N power supply system in which a power transmitting apparatus transmits the power to a plurality of power receiving apparatuses utilizing the power transmitting distance is proposed (for instance, Japanese Patent Application Laid-Open No. 2009-136132).

In the technology described in Japanese Patent Application Laid-Open No. 2009-136132, fixed pulse signals are transmitted in a standby mode in the case that the power transmitting apparatus is not supplying the power and whether or not a power receiving apparatus approaches the power transmitting apparatus within several meters is searched. When the power receiving apparatus sends its own intrinsic ID to the power transmitting apparatus, the power transmitting apparatus discriminates whether the power receiving apparatus is the power receiving apparatus of a power supply target. In the case of the power receiving apparatus of the power supply target, the power transmitting apparatus sends supply power to the power receiving apparatus. At the time, the power transmitting apparatus can send an intrinsic code to the power receiving apparatus in order to individually receive a charging amount, a state of an apparatus or the like from the power receiving apparatus.

However, in the case that the plurality of power transmitting apparatuses of the same power transmitting frequency are present, a problem arises that receiving power declines since interference occurs among electromagnetic waves output from the individual power transmitting apparatuses when the power receiving apparatus simultaneously receives wireless power supply from the plurality of power transmitting apparatuses.

It is an object of the present invention to prevent the receiving power of the power receiving apparatus from declining when the plurality of power transmitting apparatuses wirelessly supply the power to the plurality of power receiving apparatuses.

SUMMARY OF THE INVENTION

An object of the present invention is to prevent the receiving power of the power receiving apparatus. According to an aspect of the present invention, a wireless power supply system for wirelessly supplying power to a power receiving apparatus assigned comprises: an assigning unit configured to assign the power receiving apparatus to a power transmitting apparatus; and a determining unit configured to determine a power supplying schedule such that, when the assigning unit assigns a particular power receiving apparatus to a plurality of power transmitting apparatuses, the plurality of power transmitting apparatuses supply the power to the particular power receiving apparatus, not simultaneously.

Further features of the present invention will become apparent from the following description of exemplary embodiments with reference to the attached drawings.

BRIEF DESCRIPTION OF THE DRAWINGS

FIG. 10A is a diagram (number 1) illustrating one example of a time-sharing power supply schedule management table.

FIG. 10B is a diagram (number 2) illustrating one example of the time-sharing power supply schedule management table.

FIG. 10C is a diagram (number 3) illustrating one example of the time-sharing power supply schedule management table.

FIG. 10D is a diagram (number 4) illustrating one example of the time-sharing power supply schedule management table.

FIG. 10E is a diagram (number 5) illustrating one example of the time-sharing power supply schedule management table.

FIG. 10F is a diagram (number 6) illustrating one example of the time-sharing power supply schedule management table.

FIG. 10G is a diagram (number 7) illustrating one example of the time-sharing power supply schedule management table.

FIG. 10H is a diagram (number 8) illustrating one example of the time-sharing power supply schedule management table.

FIG. 10I is a diagram (number 9) illustrating one example of the time-sharing power supply schedule management table.

FIG. 10J is a diagram (number 10) illustrating one example of the time-sharing power supply schedule management table.

FIG. 10K is a diagram (number 11) illustrating one example of the time-sharing power supply schedule management table.

FIG. 10L is a diagram (number 12) illustrating one example of the time-sharing power supply schedule management table.

FIG. 15A is a diagram (number 13) illustrating one example of the time-sharing power supply schedule management table.

FIG. 15B is a diagram (number 14) illustrating one example of the time-sharing power supply schedule management table.

FIG. 15C is a diagram (number 15) illustrating one example of the time-sharing power supply schedule management table.

FIG. 15D is a diagram (number 16) illustrating one example of the time-sharing power supply schedule management table.

FIG. 15E is a diagram (number 17) illustrating one example of the time-sharing power supply schedule management table.

DESCRIPTION OF THE EMBODIMENTS

Preferred embodiments of the present invention will now be described in detail in accordance with the accompanying drawings.

Embodiment 1

Figure 1:
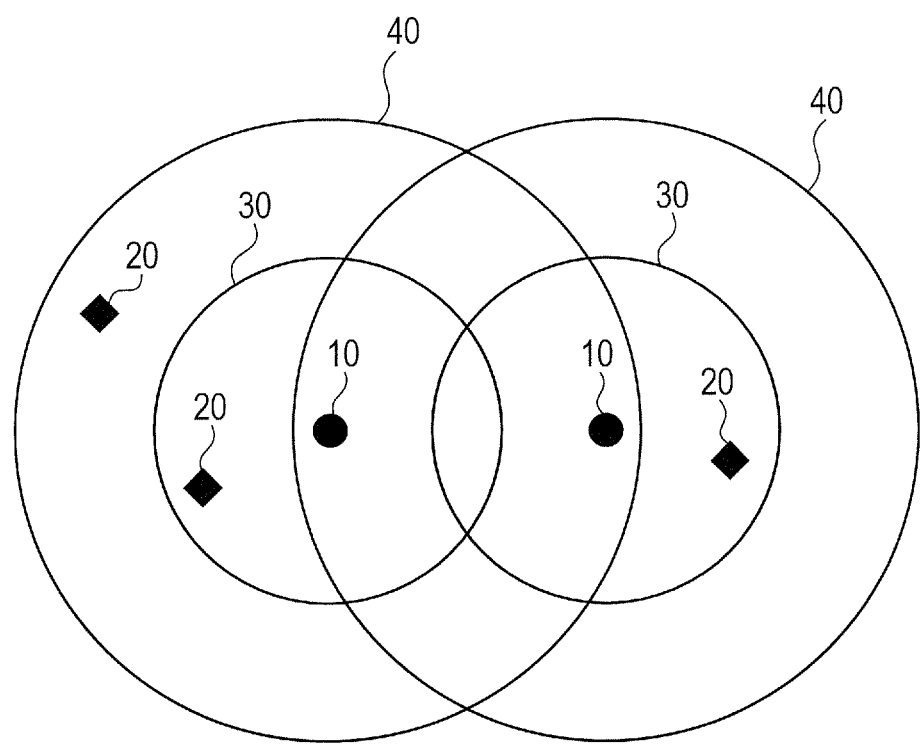
FIG. 1 is a conceptual diagram (number 1) illustrating one example of a configuration of an N-to-N wireless power supply system.

FIG. 1 is a conceptual diagram illustrating one example of a configuration of an N-to-N wireless power supply system in which a plurality of power transmitting apparatuses transmit power to a plurality of wireless power receiving apparatuses.

A power transmitting apparatus 10 wirelessly transmits the power to a power receiving apparatus 20. Also, the power transmitting apparatus 10 performs data communication required for power supply with the power receiving apparatus 20.

The power receiving apparatus 20 wirelessly receives the power from the power transmitting apparatus 10. Also, the power receiving apparatus 20 performs the data communication required for the power supply with the power transmitting apparatus 10.

Figure 2:
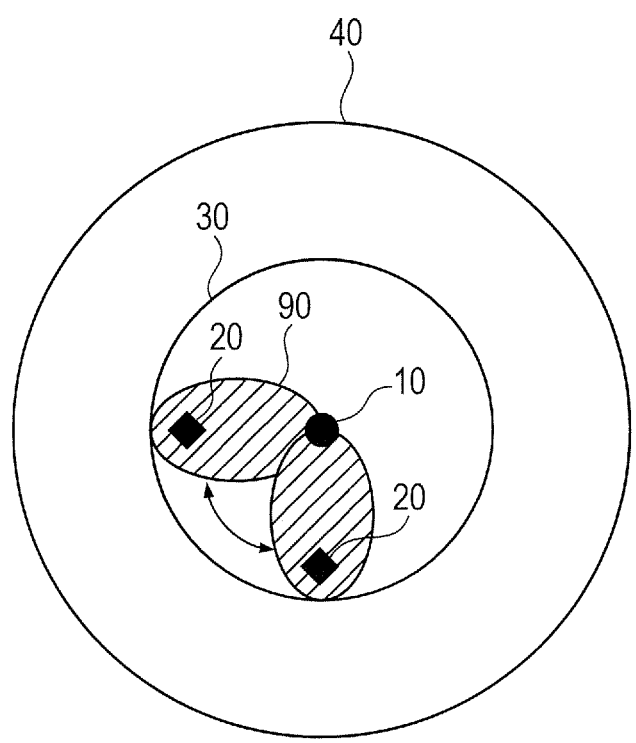
FIG. 2 is a diagram illustrating one example of directivity of a power transmitting direction.

A power supply area 30 is an area where the power supply can be executed from the power transmitting apparatus 10 to the power receiving apparatus 20. However, the power transmitting apparatus 10 cannot simultaneously supply the power to the entire power supply area 30, and has directivity in a power supply direction as illustrated in FIG. 2. A range 90 in FIG. 2 illustrates a power supply range of the power transmitting apparatus 10 at a certain point of time. For instance, in the case that the plurality of power receiving apparatuses 20 exist, the power transmitting apparatus 10 switches the power supply direction in each period for which a power supply period is time-shared, and supplies the power to the respective power receiving apparatuses 20. Details will be described later.

A communication area 40 is an area where data communication can be executed between the power transmitting apparatuses 10, and an area where the data communication can be executed between the power transmitting apparatus 10 and the power receiving apparatus 20.

As a relation between the power supply area 30 and the communication area 40, the communication area 40 is wider than the power supply area 30, and the power supply area 30 is completely included in the communication area 40.

Also, as illustrated in FIG. 1, in the case that a plurality of power transmitting apparatuses 10 are present in the communication area 40, a group is formed among the power transmitting apparatuses 10, and one power transmitting apparatus 10 becomes a master and controls entire power transmission and communication inside the wireless power supply system.

Also, the master power transmitting apparatus 10 tests if the power receiving apparatus 20 present inside the communication area 40 is in the power supply area by supplying the power by training, and confirms if the power receiving apparatus 20 is in the power supply area. For instance, the master power transmitting apparatus 10 can confirm if the power receiving apparatus 20 is in the power supply area by raising and lowering the power to be supplied by 10% each and gradually widening and narrowing the power supply area 30. Also, a ratio of the power to be raised and lowered when supplying the power in the training by the master power transmitting apparatus 10 is not needed to be limited to 10% each, and may be an arbitrary ratio.

In the present embodiment, in the case that the plurality of power transmitting apparatuses 10 supply the power to the plurality of power receiving apparatuses 20, a power supply schedule is adjusted so that electromagnetic waves when the plurality of power transmitting apparatuses 10 transmit the power do not interfere, and the power is supplied. More specifically, a timing of the power supply (including a power supply period) is adjusted so that the plurality of power transmitting apparatuses 10 do not supply the power to the same power receiving apparatus 20 in the same period, and the power is supplied.

Figure 3:
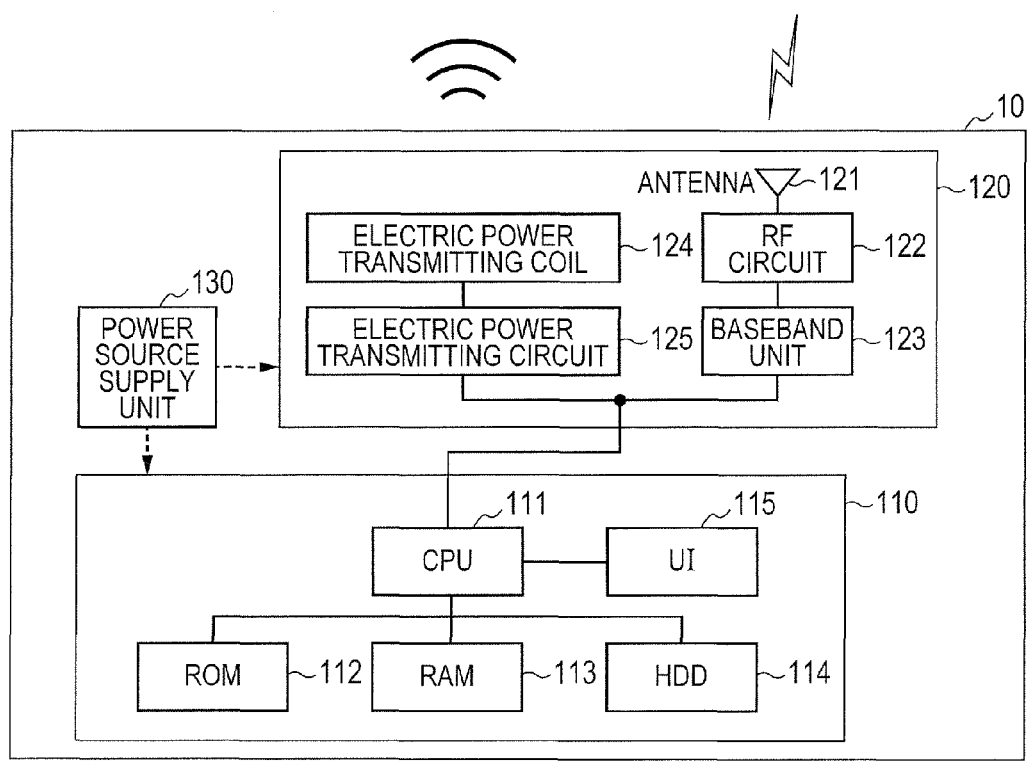
FIG. 3 is a diagram illustrating one example of a hardware configuration of a power transmitting apparatus.

FIG. 3 is a diagram illustrating one example of a hardware configuration of the power transmitting apparatus. In FIG. 3, a line indicating data exchange is illustrated by a solid line, and a line indicating the power supply is illustrated by a dotted line.

The power transmitting apparatus 10 includes a control unit 110, a wireless transmission unit 120, and a power source supply unit 130.

The control unit 110 controls the power transmitting apparatus 10. The control unit 110 includes a CPU 111, a ROM 112, a RAM 113, an HDD 114 and a UI 115. The control unit 110 is connected with the wireless transmission unit 120 and the power source supply unit 130 by an internal bus.

The CPU 111 executes various kinds of processing and controls the power transmitting apparatus 10. The CPU 111 realizes a function of the power transmitting apparatus 10, the processing of a sequence diagram related to the power transmitting apparatus 10 to be described later, and the processing of a flowchart, by executing a program stored in the ROM 112, the HDD 114 or the like.

The ROM 112 is a non-volatile storage medium, and stores a boot program or the like to be used by the CPU 111.

The RAM 113 is a volatile storage medium, and temporarily stores data, a program or the like to be used by the CPU 111.

The HDD 114 is a non-volatile storage medium, and stores an OS, an application or the like to be used by the CPU 111.

The UI 115 displays various information to a user, and receives various instructions from the user.

The wireless transmission unit 120 wirelessly transmits the power to the power receiving apparatus 20. The wireless transmission unit 120 includes an antenna 121, an RF circuit 122, a baseband unit 123, a power transmitting coil 124 and a power transmitting circuit 125.

The antenna 121 receives the electromagnetic waves, converts the electromagnetic waves to electric signals, and converts the electric signals to the electromagnetic waves.

The RF circuit 122 modulates baseband signals to a frequency band (RF band) during transmission. Also, the RF circuit 122 demodulates signals of the frequency band to the baseband signals during reception.

The baseband unit 123 AD converts the baseband signals demodulated in the RF circuit 122, and transmits the baseband signals to the CPU 111. Also, the baseband unit 123 transmits the baseband signals for which the electric signals from the CPU 111 are DA converted to the RF circuit 122.

The power transmitting circuit 125 generates modulated signals for transmitting the power.

The power transmitting coil 124 transmits the modulated signals modulated by the power transmitting circuit 125 to the power receiving apparatus 20. The power source supply unit 130 converts an AC voltage from an AC power source to a DC voltage, and supplies the DC voltage to the control unit 110 and the wireless transmission unit 120.

Figure 4:
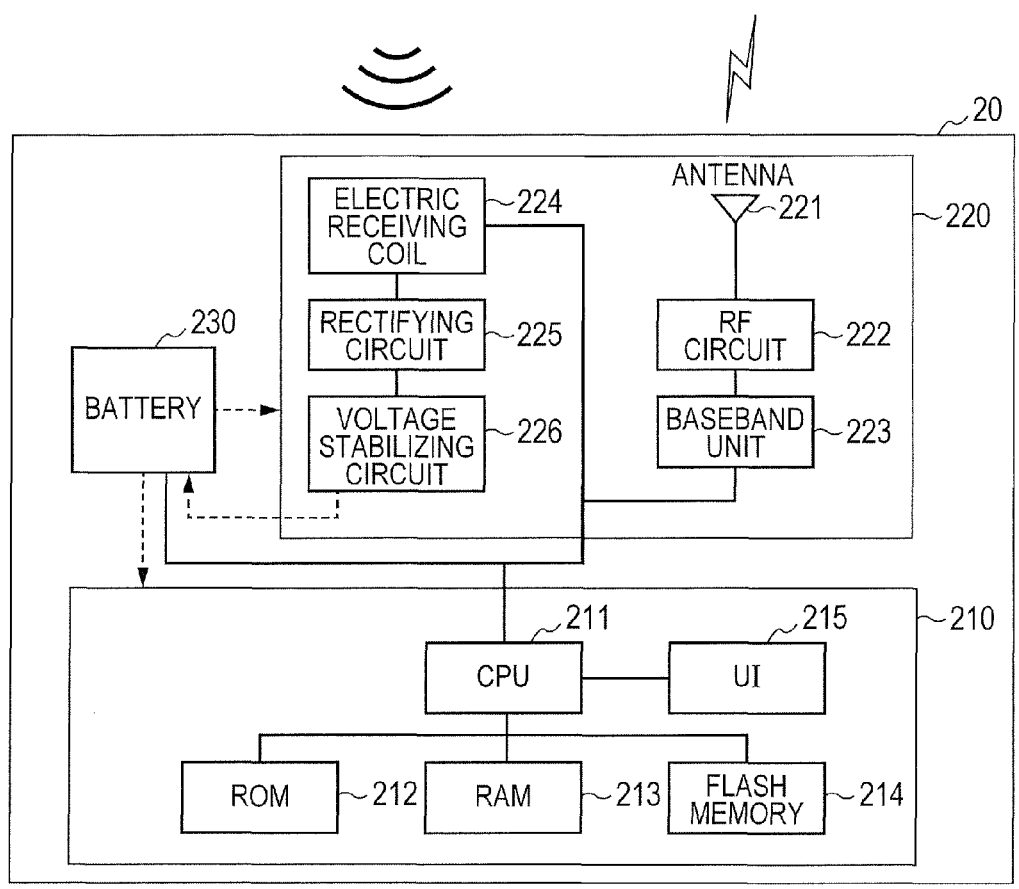
FIG. 4 is a diagram illustrating one example of a hardware configuration of a power receiving apparatus.

FIG. 4 is a diagram illustrating one example of a hardware configuration of the power receiving apparatus. In FIG. 4, the line indicating the data exchange is illustrated by a solid line, and the line indicating the power supply is illustrated by a dotted line.

The power receiving apparatus 20 includes a control unit 210, a wireless communication unit 220 and a battery 230.

The control unit 210 controls the power receiving apparatus 20.

The control unit 210 includes a CPU 211, a ROM 212, a RAM 213, a flash memory 214, and a UI 215. The control unit 210 is connected with the wireless communication unit 220 and the battery 230 by an internal bus.

The CPU 211 executes various kinds of processing, and controls the power receiving apparatus 20. The CPU 211 realizes a function of the power receiving apparatus 20, and the processing of a sequence diagram related to the power receiving apparatus 20 to be described later, by executing the program stored in the ROM 212, the flash memory 214 or the like.

The ROM 212 is a non-volatile storage medium, and stores a boot program or the like to be used by the CPU 211.

The RAM 213 is a volatile storage medium, and temporarily stores data, a program or the like to be used by the CPU 211.

The flash memory 214 is an electrically rewritable non-volatile storage medium, and stores an OS, an application or the like to be used by the CPU 211.

The UI 215 displays various information to the user, and receives various instructions from the user.

The wireless communication unit 220 wirelessly receives the power and the data from the power transmitting apparatus 10, and wirelessly transmits the data of the power receiving apparatus 20 to the power transmitting apparatus 10. The wireless communication unit 220 includes an antenna 221, an RF circuit 222, a baseband unit 223, a power receiving coil 224, a rectifying circuit 225 and a voltage stabilizing circuit 226.

The antenna 221 receives the electromagnetic waves, converts the electromagnetic waves to the electric signals, and converts the electric signals to the electromagnetic waves.

The RF circuit 222 modulates the baseband signals to the frequency band (RF band) during the transmission. Also, the RF circuit 222 demodulates the signals of the frequency band to the baseband signals during the reception.

The baseband unit 223 AD converts the baseband signals from the RF circuit 222, and transmits the baseband signals to the CPU 211. Also, the baseband unit 223 transmits the baseband signals for which the electric signals from the CPU 211 are DA converted to the RF circuit 222.

The power receiving coil 224 receives the modulated signals from the power transmitting apparatus 10.

The rectifying circuit 225 rectifies the power received from the power receiving coil 224 and generates the DC voltage.

The voltage stabilizing circuit 226 stabilizes the DC voltage generated by the rectifying circuit 225.

The battery 230 receives the voltage stabilized by the voltage stabilizing circuit 226, and stores the power. Also, the battery 230 supplies the DC voltage to the control unit 210 and the wireless communication unit 220 based on the accumulated electric power.

Figure 5:
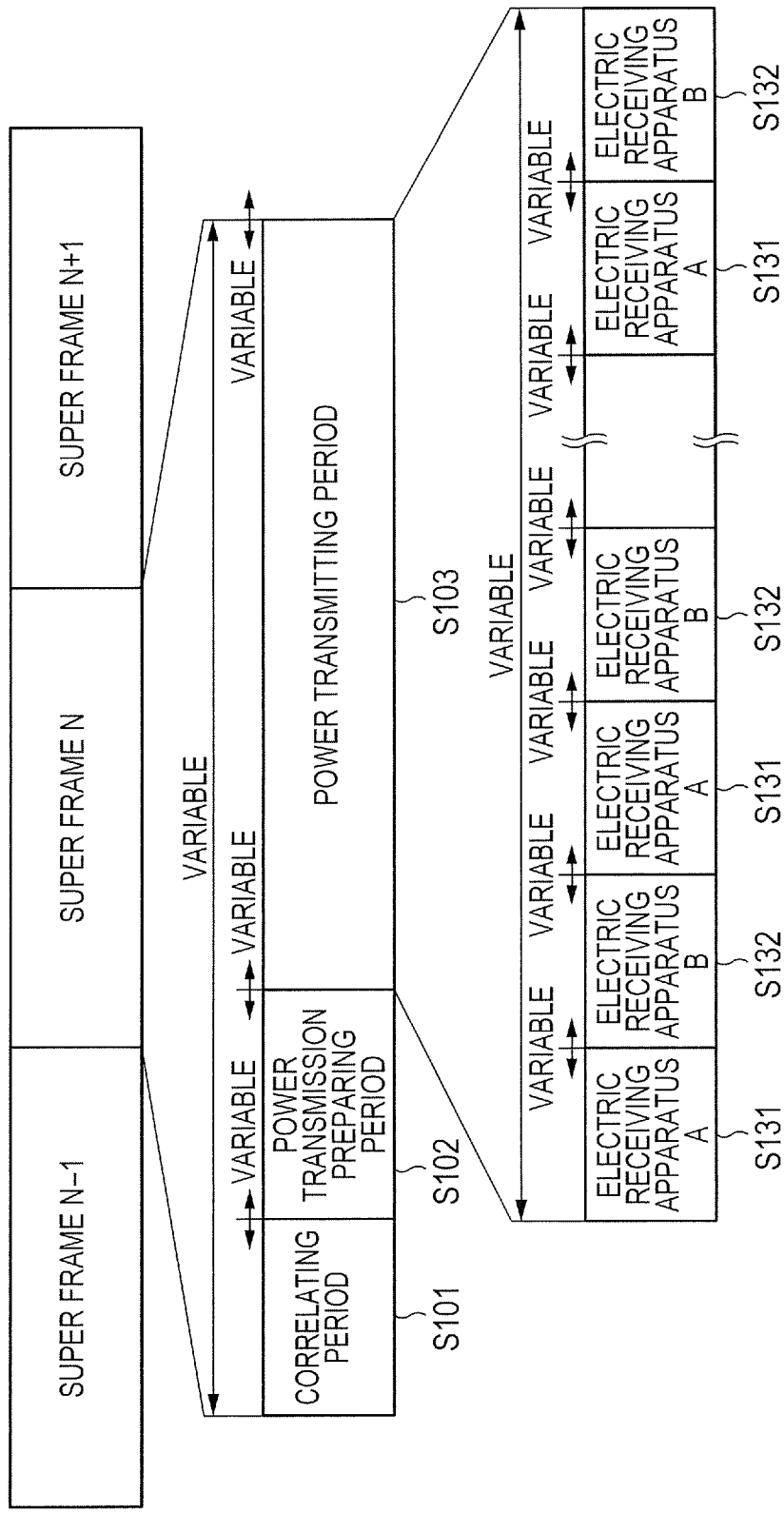
FIG. 5 is a diagram illustrating one example of a structure of a super frame.

FIG. 5 is a diagram illustrating one example of a structure of a super frame.

In the wireless power supply system described above, the power transmitting apparatus repeats the processing based on such a super frame, and thus the wireless power supply is realized.

One super frame includes S101 (correlating period), S102 (power transmission preparing period), and S103 (power transmitting period). The respective periods are variable.

In S101, in the case that there is another power transmitting apparatus 10 inside the communication area of the power transmitting apparatus 10, information such as a device ID (device information), the power supply area, the communication area, and the maximum transmission power is exchanged between the power transmitting apparatuses 10, a group is formed, and the wireless power supply system is constructed. At the time, the plurality of power transmitting apparatuses 10 in the communication area determine the master power transmitting apparatus 10 that controls (manages) the entire power transmission and communication inside the wireless power supply system. Also, the master power transmitting apparatus 10 confirms the device ID and necessity of the power to the power receiving apparatus 20. A slave power transmitting apparatus 10 also confirms the device ID and the necessity of the power to the power receiving apparatus 20. The slave power transmitting apparatus 10 notifies the information of the device ID and the necessity of the power of the power receiving apparatus 20 to the master power transmitting apparatus 10. The master power transmitting apparatus 10 determines from which power transmitting apparatus 10 the power is to be transmitted to the individual power receiving apparatuses 20 inside the wireless power supply system. When there are the device ID and the necessity of the power, the processing shifts to S102. The time of shifting from S101 to S102 is also variable.

In S102, the power receiving apparatus 20 can transmit a response and acknowledgement of a frame by a data request of the power transmitting apparatus 10. A length of a response frame and a length of an acknowledgement frame are each variable. When S102 ends, the processing shifts to S103. The time of shifting from S102 to S103 is also variable.

In S103, the individual power transmitting apparatuses 10 inside the wireless power supply system transmit the power to the power receiving apparatuses 20 assigned to the respective power transmitting apparatuses 10. Also, since the power transmitting apparatus 10 has the directivity in the power transmitting direction, in the case of supplying the power to the plurality of power receiving apparatuses 20, the power transmitting period (power supply period) is time-shared, and the power is supplied so as not to interfere with the electromagnetic waves by the power supply from the other power transmitting apparatus in each time-shared period. For instance, in the case that the power receiving apparatuses 20 are the two of a power receiving apparatus A and a power receiving apparatus B, the power transmitting apparatus 10 sections the period into a period 5131 of supplying the power to the power receiving apparatus A and a period 5132 of supplying the power to the power receiving apparatus B and alternately supplies the power as illustrated in FIG. 5.

Also, when the wireless power supply system is constructed by the plurality of power transmitting apparatuses 10, an operation in the group is maintained until a predetermined condition changes. For instance, when power reception of one power receiving apparatus 20 is completed, the master power transmitting apparatus 10 stops the entire power transmission and reconstructs the system according to a power reception completion notice from the power receiving apparatus 20. Also, the master power transmitting apparatus 10 reconstructs the system when the power receiving apparatus 20 is newly added inside the communication area or when the power receiving apparatus 20 under charging is eliminated from the communication area. Also, the master power transmitting apparatus 10 reconstructs the system when the power transmitting apparatus 10 is newly added inside the communication area or when the power transmitting apparatus 10 under the power transmission is eliminated from the communication area.

Figure 6:
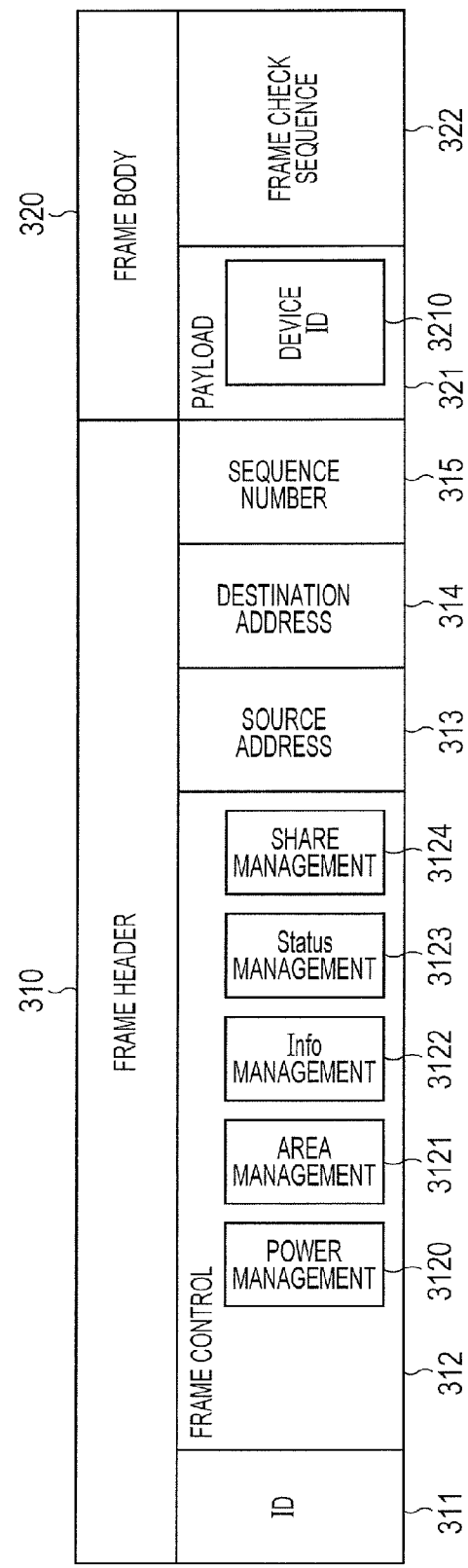
FIG. 6 is a diagram illustrating one example of a structure of a frame format.

FIG. 6 is a diagram illustrating one example of a structure of a frame format.

Inside the super frame described above, the data communication for the wireless power supply is realized using a packet of the frame format as in FIG. 6.

A frame header 310 indicates a destination or the like when transferring data. The frame header 310 includes an ID 311, frame control 312, a source address 313, a destination address 314 and a sequence number 315.

The ID 311 is an ID used when performing the data communication in the wireless power supply system.

The frame control 312 is information for the data exchange of the power transmitting apparatus 10 and the power receiving apparatus 20. The frame control 312 includes power management 3120, area management 3121, info management 3122, status management 3123, and share management 3124.

The power management 3120 is data that confirms the necessity of the power.

The area management 3121 is data that confirms an extent of the power supply area 30 of the power transmitting apparatus 10.

The power transmitting apparatus 10 confirms if the individual power receiving apparatuses 20 present inside its own communication area 40 exist inside the power supply area 30, and has data that indicates the extent of the power supply area.

The info management 3122 is data that confirms information of the power supply area, the communication area and the maximum transmission power of the power transmitting apparatus 10.

The status management 3123 is data that confirms a status such as a power saving mode of the power transmitting apparatus 10.

The share management 3124 is data that indicates at what timing and in what order the power is to be transmitted from which power transmitting apparatus 10 to the individual power receiving apparatuses 20 inside the wireless power supply system determined by the master power transmitting apparatus 10.

The source address 313 is an address of a source when transferring the data.

The destination address 314 is an address of a destination when transferring the data.

The sequence number 315 is a number of the frame.

A frame body 320 is information of a data body when transferring the data. The frame body 320 includes a payload 321, and a frame check sequence 322.

The payload 321 is the data body. For instance, the device ID 3210 is assigned to the payload 321.

The frame check sequence 322 is data that checks errors of the payload 321.

Figure 7:
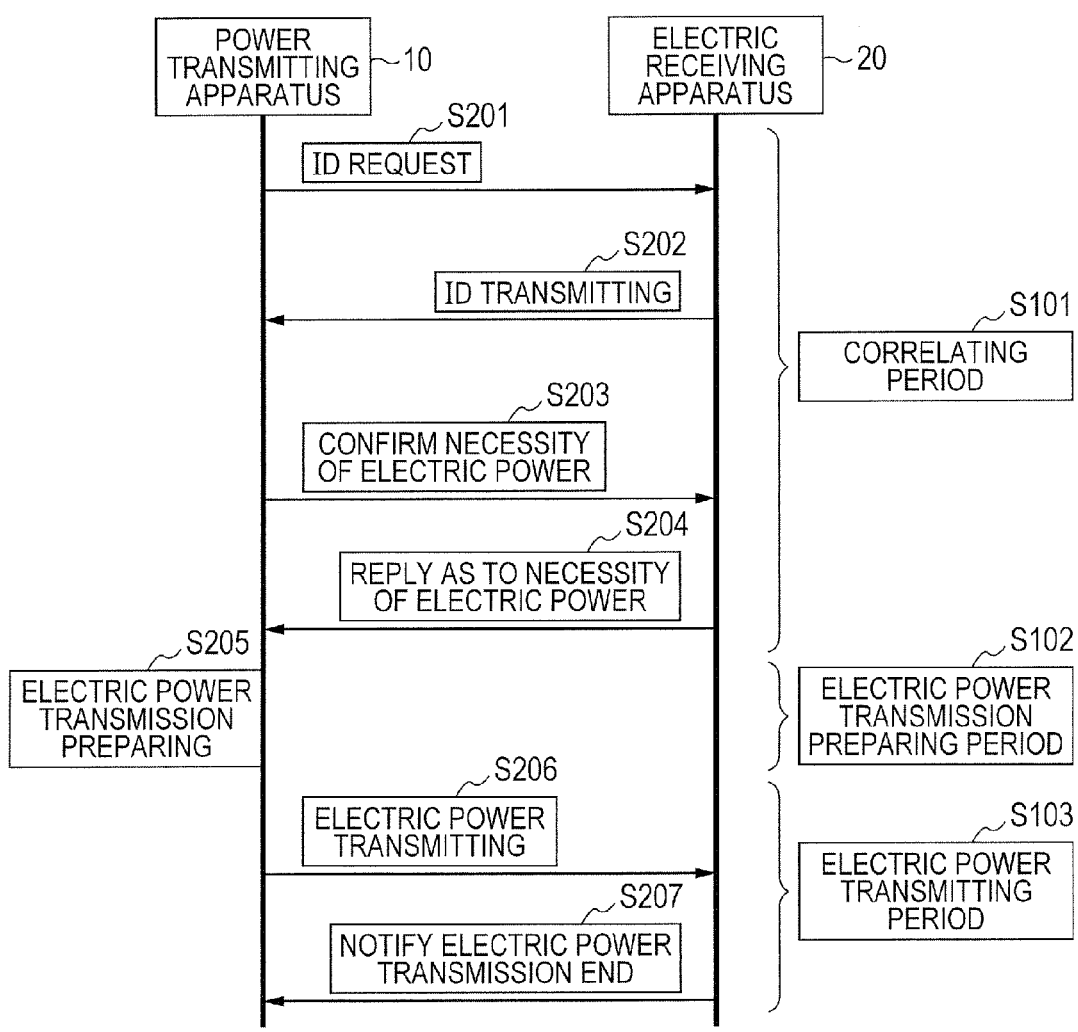
FIG. 7 is a diagram illustrating one example of sequence processing between the power transmitting apparatus and the power receiving apparatus.

FIG. 7 is a diagram illustrating one example of sequence processing in the data exchange between the power transmitting apparatus and the power receiving apparatus in the super frame.

Inside the super frame described above, the data communication for the wireless power supply is realized by the exchange as in FIG. 7.

In S201, the power transmitting apparatus 10 requests the device ID to the power receiving apparatus 20. At the time, the power transmitting apparatus 10 uses the ID 311 of the frame format.

In S202, the power receiving apparatus 20 transmits the device ID 3210 to the power transmitting apparatus 10. At the time, the power receiving apparatus 20 uses the ID 311 of the frame format.

In S203, the power transmitting apparatus 10 confirms the necessity of the power to the power receiving apparatus 20. At the time, the power transmitting apparatus 10 uses the power management 3120 of the frame format.

In S204, the power receiving apparatus 20 notifies power necessity to the power transmitting apparatus 10 when the power receiving apparatus 20 needs the power. Also, in S204, the power receiving apparatus 20 notifies power unnecessity to the power transmitting apparatus 10 when the power receiving apparatus 20 does not need the power. At the time, the power receiving apparatus 20 uses the power management 3120 of the frame format.

In S205, the power transmitting apparatus 10 prepares for the power transmission.

In S206, the power transmitting apparatus 10 transmits the power to the power receiving apparatus 20.

In S207, when the battery becomes full (fully charged), the power receiving apparatus 20 notifies power transmission end to the power transmitting apparatus 10. At the time, the power receiving apparatus 20 uses the power management 3120 of the frame format.

Figure 8:
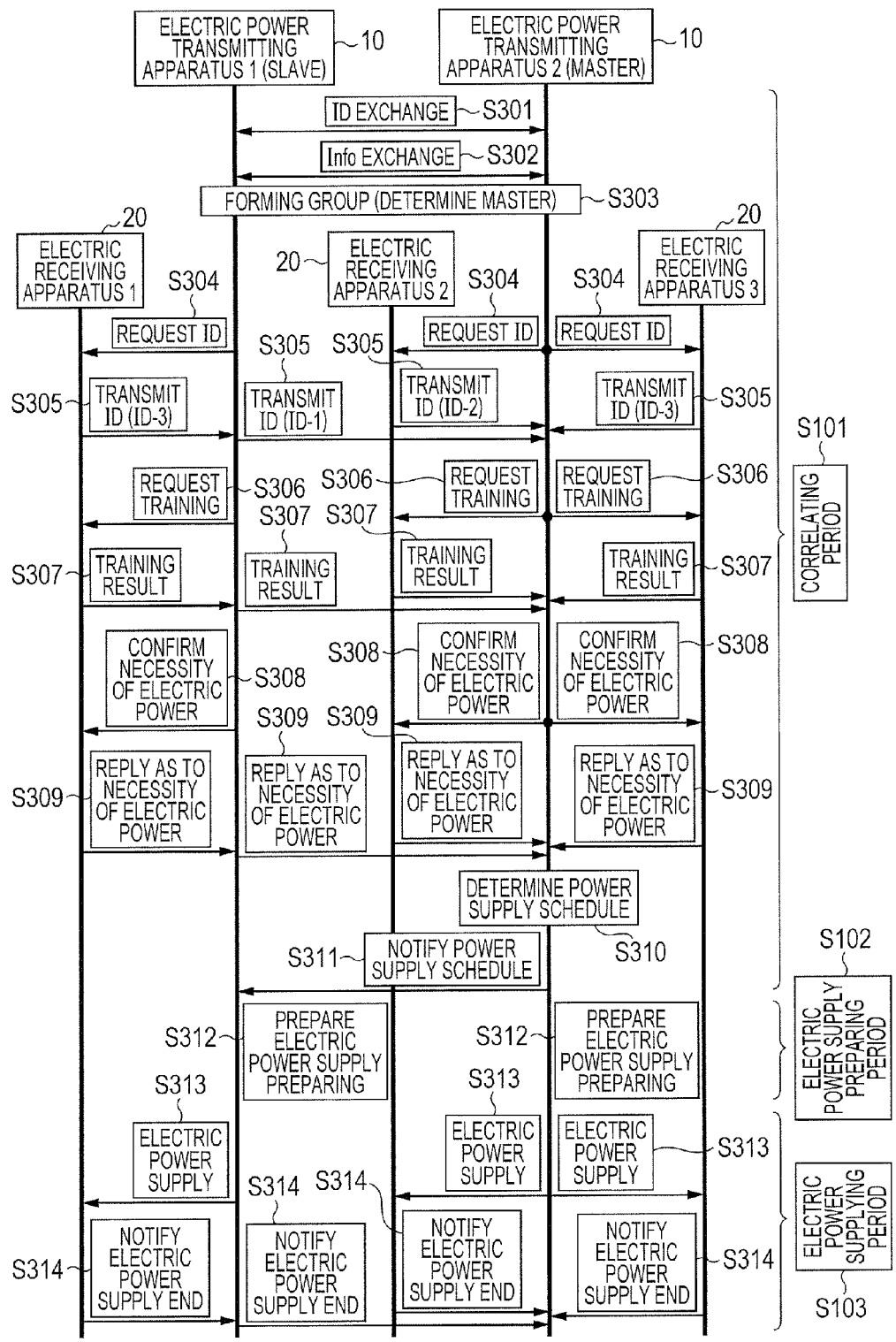
FIG. 8 is a diagram illustrating one example of sequence processing among the individual apparatuses of the wireless power supply system.

FIG. 8 is a diagram illustrating one example of the sequence processing in the data exchange among the individual apparatuses of the N-to-N wireless power supply system in which the plurality of power transmitting apparatuses transmit the power to the plurality of wireless power receiving apparatuses.

Inside the super frame described above, by the exchange as in FIG. 8, the data communication for the wireless power supply is realized in the N-to-N wireless power supply system in which the plurality of power transmitting apparatuses transmit the power to the plurality of wireless power receiving apparatus.

In S301, a power transmitting apparatus 1(10) and another power transmitting apparatus 2(10) exchange the information of the device ID. At the time, the power transmitting apparatus 1(10) and the power transmitting apparatus 2(10) use the ID 311 of the frame format.

In S302, the power transmitting apparatus 1(10) and the power transmitting apparatus 2(10) exchange the information of the power supply area, the communication area and the maximum transmission power. At the time, the power transmitting apparatus 1(10) and the power transmitting apparatus 2(10) use the info management 3122 of the frame format.

In S303, a group is formed by the power transmitting apparatus 1(10) and the power transmitting apparatus 2(10). This example illustrates the case that the power transmitting apparatus 2(10) is determined as a master and the power transmitting apparatus 1(10) is determined as a slave.

In S304, the master power transmitting apparatus 2(10) requests the device ID to the individual power receiving apparatuses 20. At the time, the master power transmitting apparatus 2(10) uses the ID 311 of the frame format. The master power transmitting apparatus 2(10) requests the device ID directly to a power receiving apparatus 2(20) and a power receiving apparatus 3(20) inside the communication area of the present apparatus. Also, the master power transmitting apparatus 2(10) requests the device ID to a power receiving apparatus 1(20) inside the communication area of the slave power transmitting apparatus 1(10) through the slave power transmitting apparatus 1(10).

In S305, the master power transmitting apparatus 2(10) receives the device ID 3210 from the individual power receiving apparatuses 20. At the time, the individual power receiving apparatuses 20 use the ID 311 of the frame format. The master power transmitting apparatus 2(10) receives the device ID 3210 directly from the power receiving apparatus 2(20) and the power receiving apparatus 3(20) inside the communication area of the present apparatus. Also, the master power transmitting apparatus 2(10) receives the device ID 3210 from the power receiving apparatus 1(20) inside the communication area of the slave power transmitting apparatus 1(10) through the slave power transmitting apparatus 1(10).

In S306, the master power transmitting apparatus 2(10) confirms the power supply area of which power supply device the individual power receiving apparatuses 20 are in by a training request. At the time, the master power transmitting apparatus 2(10) uses the area management 3121 of the frame format. The master power transmitting apparatus 2(10) directly confirms the power receiving apparatus 2(20) and the power receiving apparatus 3(20) inside the communication area of the present apparatus. Also, the master power transmitting apparatus 2(10) confirms the power receiving apparatus 1(20) inside the communication area of the slave power transmitting apparatus 1(10) through the slave power transmitting apparatus 1(10).

In S307, the individual power receiving apparatuses 20 calculate how much power has been supplied by the power supply by training, and notify a result to the master power transmitting apparatus 2(10). At the time, the individual power receiving apparatuses 20 use the area management 3121 of the frame format. The power receiving apparatus 2(20) and the power receiving apparatus 3(20) inside the communication area of the master power transmitting apparatus 2(10) notify the result directly to the master power transmitting apparatus 2(10). Also, the power receiving apparatus 1(20) inside the communication area of the slave power transmitting apparatus 1(10) notifies the result through the slave power transmitting apparatus 1(10).

In S308, the master power transmitting apparatus 2(10) confirms the necessity of the power to the individual power receiving apparatuses 20. At the time, the master power transmitting apparatus 2(10) uses the power management 3120 of the frame format. The master power transmitting apparatus 2(10) directly confirms the necessity of the power to the power receiving apparatus 2(20) and the power receiving apparatus 3(20) inside the communication area of the present apparatus. Also, the master power transmitting apparatus 2(10) confirms the necessity of the power to the power receiving apparatus 1(20) inside the communication area of the slave power transmitting apparatus 1(10) through the slave power transmitting apparatus 1(10).

In S309, the individual power receiving apparatuses 20 notify the power necessity to the master power transmitting apparatus 2(10) when the power is needed in the individual power receiving apparatuses 20. Also, in S309, the individual power receiving apparatuses 20 notify the power unnecessity to the master power transmitting apparatus 2(10) when the power is not needed in the individual power receiving apparatuses 20. At the time, the individual power receiving apparatuses 20 use the power management 3120 of the frame format. The power receiving apparatus 2(20) and the power receiving apparatus 3(20) inside the communication area of the master power transmitting apparatus 2(10) directly give a notice to the master power transmitting apparatus 2(10). Also, the power receiving apparatus 1(20) inside the communication area of the slave power transmitting apparatus 1(10) gives a notice through the slave power transmitting apparatus 1(10).

In S310, the master power transmitting apparatus 2(10) determines the power supply schedule indicating at what timing and in what order the power is to be transmitted from which power transmitting apparatus 10 to the individual power receiving apparatuses 20 inside the wireless power supply system. At the time, the master power transmitting apparatus 2(10) determines how assigning is to be performed from the information of the power supply area, the communication area and the maximum transmission power of the individual power transmitting apparatuses 10 and the information of the number of the apparatuses and the needed power of the individual power receiving apparatuses 20 or the like.

In S311, the master power transmitting apparatus 2(10) notifies the determined power supply schedule to the slave power transmitting apparatus 1(10). At the time, the master power transmitting apparatus 2(10) uses the share management 3124 of the frame format.

In S312, the individual power transmitting apparatuses 10 prepare for the power transmission.

In S313, the individual power transmitting apparatuses 10 transmit the power to the individual power receiving apparatuses 20. In this example, the master power transmitting apparatus 2(10) transmits the power to the power receiving apparatus 2(20) and the power receiving apparatus 3(20). Then, the slave power transmitting apparatus 1(10) transmits the power to the power receiving apparatus 1(20). At the time, the individual power transmitting apparatuses 10 are synchronized and match the timing of power supply start. More specifically, the master power transmitting apparatus 2(10) may be synchronized by transmitting synchronizing signals to the slave power transmitting apparatus 1(10), or may be synchronized according to a predetermined timing.

In S314, when the battery becomes full, the individual power receiving apparatuses 20 notify the power transmission end to the individual power transmitting apparatuses 10. At the time, the individual power receiving apparatuses 20 use the power management 3120 of the frame format. The power receiving apparatus 2(20) and the power receiving apparatus 3(20) inside the communication area of the master power transmitting apparatus 2(10) directly notify the master power transmitting apparatus 2(10). Also, the power receiving apparatus 1(20) inside the communication area of the slave power transmitting apparatus 1(10) gives a notice through the slave power transmitting apparatus 1(10). When the power transmission end is notified from any one of the power receiving apparatuses 20, the master power transmitting apparatus 2(10) stops the entire power transmission and reconstructs the system.

Hereinafter, the operation of the N-to-N wireless power supply system in which the plurality of power transmitting apparatuses transmit the power to the plurality of wireless power receiving apparatuses according to the present embodiment will be described.

Figure 9:
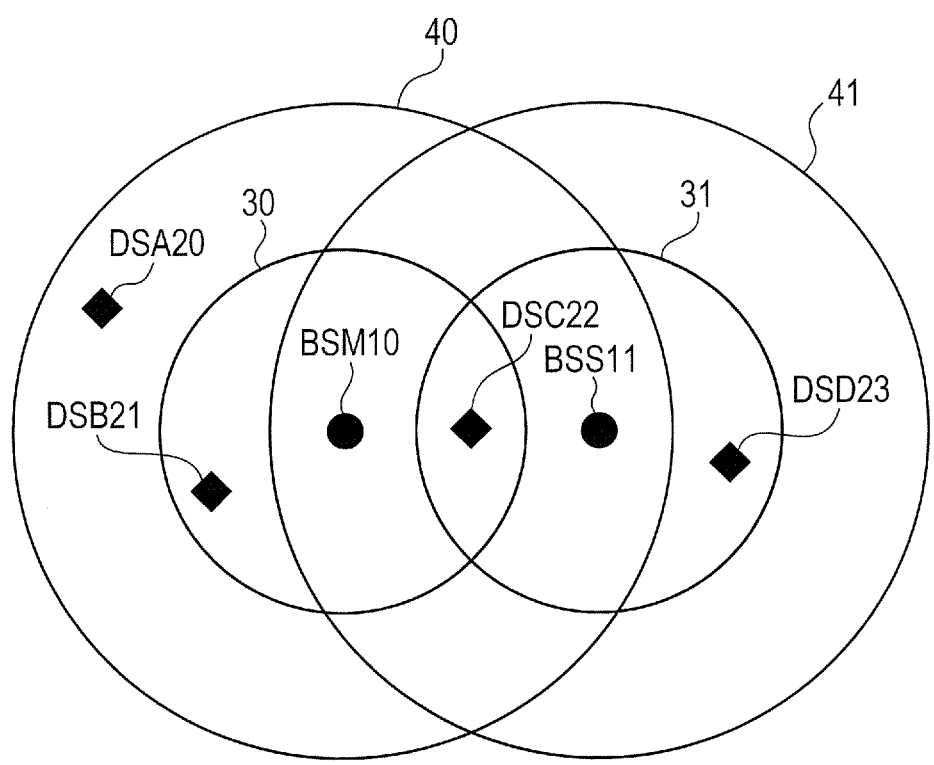
FIG. 9 is a conceptual diagram (number 2) illustrating one example of the configuration of the N-to-N wireless power supply system.

For instance, the operation will be described for the case that a power receiving apparatus DSC22 exists in an area where the power can be supplied from both of a plurality of power transmitting apparatuses BSM10 and BSS11 as illustrated in FIG. 9.

In the example in FIG. 9, there are two power transmitting apparatuses, and the master power transmitting apparatus is BSM10, and the slave power transmitting apparatus is BSS11. The power supply area of the master power transmitting apparatus BSM10 is indicated by 30, and the communication area is indicated by 40. The power supply area of the slave power transmitting apparatus BSS11 is indicated by 31, and the communication area is indicated by 41. There are four power receiving apparatuses, and are arranged at positions as follows, respectively. A power receiving apparatus DSA20 exists inside the master communication area 40. A power receiving apparatus DSB21 exists inside the master power supply area 30. The power receiving apparatus DSC22 exists inside an area where the master power supply area 30 and the slave power supply area overlap. A power receiving apparatus DSD23 exists inside the slave power supply area 31.

A management table illustrated in FIGS. 10A to 10L is a management table for managing IDs, statuses or the like of the individual power transmitting apparatuses and power receiving apparatuses in order for the master power transmitting apparatus BSM10 to control the entire wireless power supply system.

The power transmitting apparatus BSM10 manages the information of the communication area, the power supply area, the maximum supply power, the power receiving apparatus inside the communication area, and the power receiving apparatus under the power supply, for instance, in a power transmitting apparatus management table 1201 as management information of the power transmitting apparatuses BSM10 and BSS11 (FIG. 10A).

Also, the power transmitting apparatus BSM10 manages the power supply timing of the master power transmitting apparatus BSM10 and the power supply timing of the slave power transmitting apparatus BSS11 in a time-sharing power supply schedule management table 1202 as the management information of the power transmitting apparatuses BSM10 and BSS11. In the present embodiment, the number of repeating cycles is defined as six cycles T1 to T6, but is not limited thereto (FIG. 10B).

Also, the power transmitting apparatus BSM10 manages information such as in which area the apparatus exists, from which power transmitting apparatus the power can be supplied, and how much power is needed, for instance, in a power receiving side management table 1203 as the management information of the power receiving apparatuses DSA20, DSB21, DSC22 and DSD23 (FIG. 10C).

Figure 11:
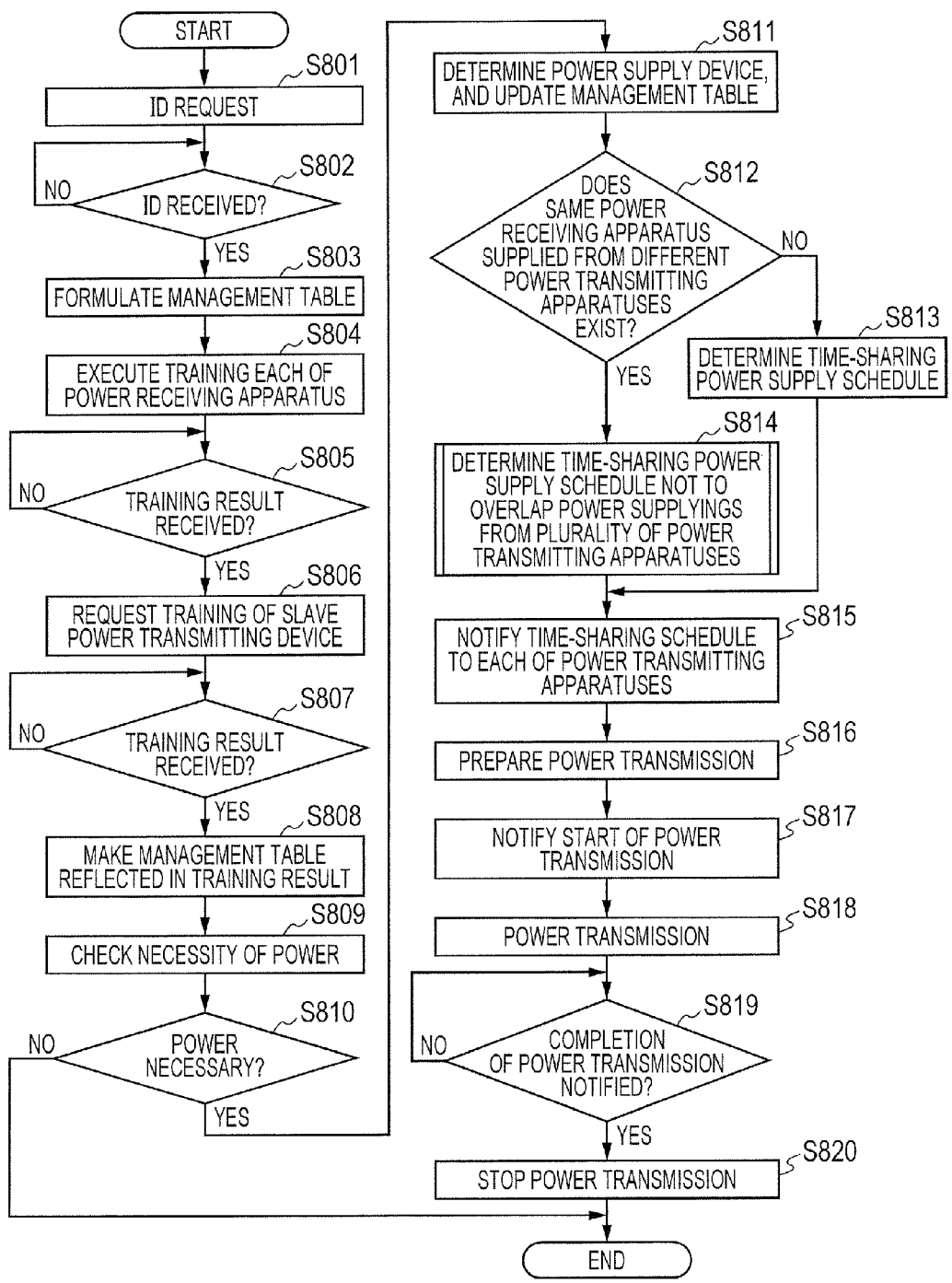
FIG. 11 is a flowchart illustrating one example of processing in a master power transmitting apparatus.

In an operation description of a flowchart in FIG. 11, the individual management tables in FIGS. 10A to 10L will be also described.

FIG. 11 is the flowchart illustrating one example of processing to be executed by the master power transmitting apparatus BSM10. As described above, the CPU 111 of the master power transmitting apparatus BSM10 executes the program stored in the ROM 112 or the like, and thus the processing in the flowchart in FIG. 11 is realized.

In S801, the CPU 111 requests the IDs to the slave power transmitting apparatus BSS11, and the individual power receiving apparatuses DSA20, DSB21 and DSC22 through the wireless transmission unit 120.

In S802, the CPU 111 receives the IDs from the slave power transmitting apparatus BSS11, and the individual power receiving apparatuses DSA20, DSB21 and DSC22 through a wireless reception unit (not shown in the figure) (Yes in S802). From the slave power transmitting apparatus BSS11, the CPU 111 also receives the IDs of the power receiving apparatuses DSC22 and DSD23 present inside the communication area 41 of the slave power transmitting apparatus BSS11.

In S803, the CPU 111 registers the received IDs to the management table (FIG. 10D, and FIG. 10E).

In the example in FIG. 9, the power receiving apparatus DSA20, the power receiving apparatus DSB21 and the power receiving apparatus DSC22 are present inside the communication area 40 of the master power transmitting apparatus BSM10. Also, the power receiving apparatus DSC22 and the power receiving apparatus DSD23 are present inside the communication area 41 of the slave power transmitting apparatus BSS11.

Then, in S804, the CPU 111 performs training to the power receiving apparatus DSA20, the power receiving apparatus DSB21 and the power receiving apparatus DSC22 through the wireless transmission unit 120. In the training, if the power can be supplied from the individual power transmitting apparatuses BSM10 and BSS11 to the individual power receiving apparatuses DSA20, DSB21, DSC22 and DSD23 is tested, and in the case that the power can be supplied, it is defined that the power receiving apparatus is inside the power supply area. According to the training request, the training is performed from the power transmitting apparatus BSM10 to the power receiving apparatuses DSA20, DSB21 and DSC22, and the CPU 111 receives a training result through the wireless reception unit (Yes in S805).

In S806, the CPU 111 requests the training to the slave power transmitting apparatus BSS11 through the wireless transmission unit 120. According to the training request, the training is performed from the power transmitting apparatus BSS11 to the power receiving apparatuses DSC22 and DSD23, and the CPU 111 receives the training result from the slave power transmitting apparatus BSS11 through the wireless reception unit (Yes in S807).

In S808, the CPU 111 creates the management table according to the received training result. In the case of the example in FIG. 9, since the power receiving apparatus DSC22 is present in a part where both of the power supply areas 30 and 31 overlap, the training result is that the power can be supplied to the power receiving apparatus DSC22 from either of the power transmitting apparatuses BSM10 and BSS11 (FIG. 10F).

In S809, the CPU 111 confirms the necessity of the power to the individual power receiving apparatuses DSA20, DSB21, DSC22 and DSD23 through the wireless transmission unit 120.

The CPU 111 receives the necessity of the power from the individual power receiving apparatuses DSA20, DSB21, DSC22 and DSD23 through the wireless reception unit. Further, the CPU 111 also receives the necessity of the power of the power receiving apparatus DSD23 present inside the communication area 41 of the slave power transmitting apparatus BSS11 from the slave power transmitting apparatus BSS11 (Yes in S810).

Then, the CPU 111 updates the management table according to the necessity of the power of the individual power receiving apparatuses DSA20, DSB21, DSC22 and DSD23 (FIG. 10G).

In S811, the CPU 111 determines from which power transmitting apparatus the power is to be transmitted to the individual power receiving apparatuses DSB21, DSC22 and DSD23 with the necessity of the power inside the wireless power supply system, and updates the management table (FIG. 10H).

In S812, the CPU 111 refers to the management table and determines whether or not the same power receiving apparatuses DSB21, DSC22 and DSD23 are included in power supply device columns of the individual power transmitting apparatuses.

In S813, the CPU 111 arbitrarily assigns the individual power receiving apparatuses DSB21, DSC22 and DSD23 to the individual cycles T1 to T6 in the time-sharing power supply management table (No in S812).

In S814, the CPU 111 assigns the individual power receiving apparatuses DSB21, DSC22 and DSD23 to the individual cycles T1 to T6 in the time-sharing power supply management table such that the same power receiving apparatuses DSB21, DSC22 and DSD23 do not overlap in the same cycle of the individual power transmitting apparatuses (Yes in S812). In this case, since the power receiving apparatus DSC22 is included in the power supply device columns of the power transmitting apparatuses BSM10 and BSS11, the CPU 111 determines the schedule so that it does not overlap (FIG. 10H). Details of the processing of S814 will be described separately using a sub flowchart illustrated in FIG. 12.

In S815, the CPU 111 notifies the determined time-sharing power supply schedule to the slave power transmitting apparatus BSS11 through the wireless transmission unit 120.

In S816, the CPU 111 prepares for the power transmission according to the determined time-sharing power supply schedule. Here, the CPU 111 of the slave power transmitting apparatus BSS11 also prepares for the power transmission. Details of the processing of the slave power transmitting apparatus BSS11 will be described later using FIG. 13 or the like.

In S817, the CPU 111 notifies start of the power transmission to the slave power transmitting apparatus BSS11 through the wireless transmission unit 120. Thus, the master power transmitting apparatus BSM10 and the slave power transmitting apparatus BSS11 can be synchronized and match the timing of the power supply start.

In S818, the CPU 111 transmits the power according to the time-sharing power supply schedule management table 1202 to the individual power receiving apparatuses DSB21 and DSC22 present inside the power supply area 30 through the wireless transmission unit 120. Thus, the power supply from the power transmitting apparatus BSM10 to the individual power receiving apparatuses DSB21 and DSC22 is started. Then, the CPU 111 continues the power transmission in S818 while repeating T1 to T6 of the time-sharing power supply schedule management table 1202 until one of the batteries 230 of the individual power receiving apparatuses DSB21 and DSC22 becomes full (No in S819). Also, similarly, the CPU 111 of the slave power transmitting apparatus BSS11 transmits the power to the individual power receiving apparatuses DSC22 and DSD23 according to the time-sharing power supply schedule management table 1202. Details of the processing of the slave power transmitting apparatus BSS11 will be described later using FIG. 13 or the like.

When one of the batteries 230 of the individual power receiving apparatuses DSB21 and DSC22 becomes full, the CPU 111 receives the notice of the power transmission end from one of the power receiving apparatuses DSB21 and DSC22 through the wireless reception unit (Yes in S819).

Though not illustrated in this example, in the case that the battery 230 of the power receiving apparatus DSD23 assigned to the slave power transmitting apparatus BSS11 becomes full, the CPU 111 also receives the notice of the power transmission end from the slave power transmitting apparatus BSS11 through the wireless reception unit.

When the notice of the power transmission end is received, the CPU 111 stops the power transmission from the wireless transmission unit 120 to the individual power receiving apparatuses DSB21 and DSC 22 (S820).

Also, when the notice of the power unnecessity is received from the individual power receiving apparatuses DSB21, DSC22 and DSD23 (No in S810), the CPU 111 ends control in FIG. 11.

By the processing described above, the power supply timing is adjusted among the plurality of power transmitting apparatuses, interference of the electromagnetic waves with each other can be eliminated, and the decline of the receiving power of the power receiving apparatus can be prevented.

Figure 12:
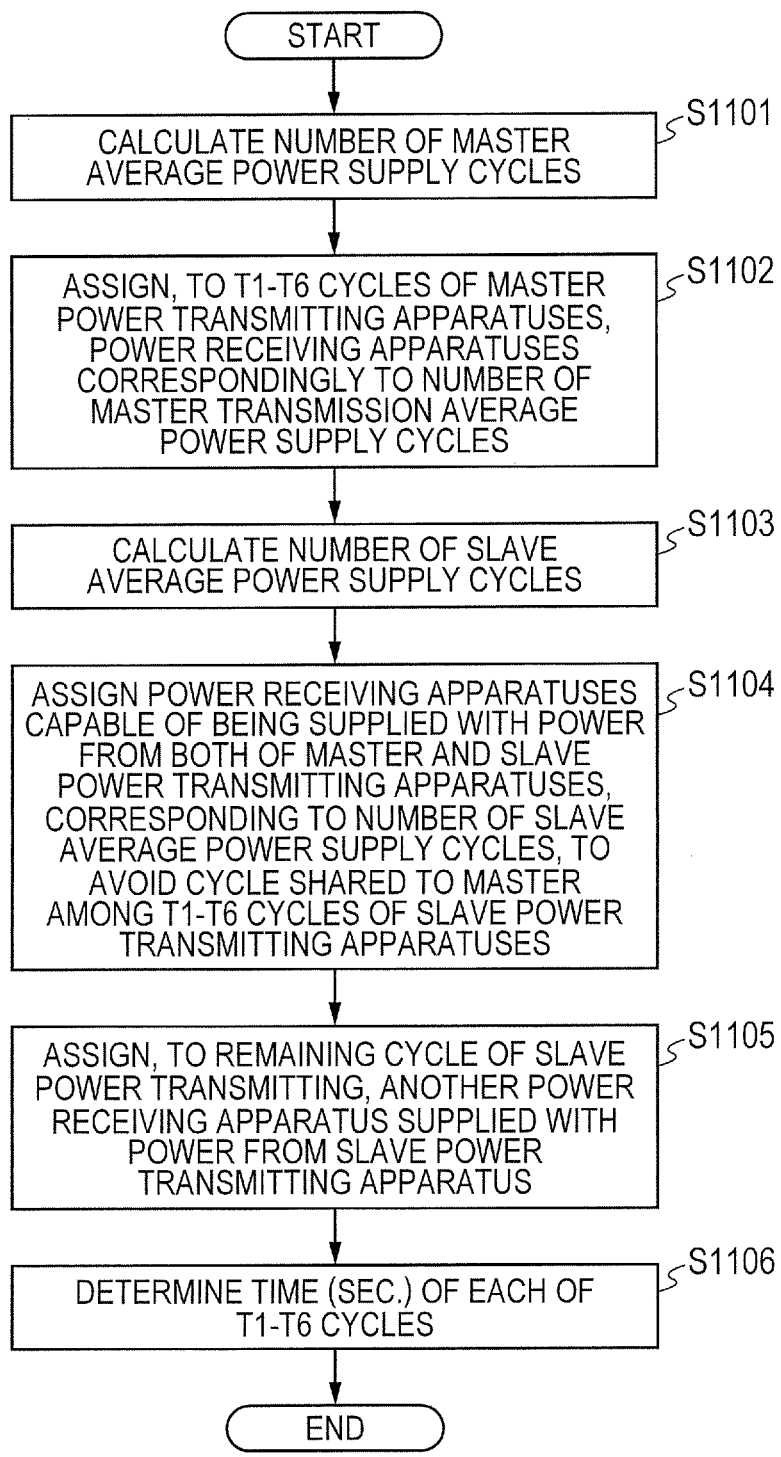
FIG. 12 is a sub flowchart (number 1) illustrating one example of the processing in the master power transmitting apparatus.

Next, details of the processing of determining the time-sharing power supply schedule in S814 in the flowchart in FIG. 11 will be described using FIG. 12. FIG. 12 is a diagram illustrating one example of the sub flowchart related to the details of the processing of S814 executed by the master power transmitting apparatus BSM10 in the present embodiment.

In S1101, the CPU 111 calculates the number of average cycles per power receiving apparatus supplied with the power from the master power transmitting apparatus BSM10 (described as the number of master average power supply cycles, hereinafter) by a calculation formula (1).

The number of master average power supply cycles=6/the number of the power receiving apparatuses of master power supply (1)

In the present embodiment, since the power receiving apparatuses supplied with the power from the master power transmitting apparatus BSM10 are the two of the power receiving apparatus DSB21 and the power receiving apparatus DSC22, the number of master average power supply cycles is 3 cycles according to the calculation formula (1).

In S1102, the CPU 111 assigns the power receiving apparatuses that can be supplied with the power to the cycles T1 to T6 of the master power transmitting apparatus BSM10 in the time-sharing power supply schedule management table 1202 in order correspondingly to the number of master average power supply cycles calculated in S1101. In the present embodiment, the CPU 111 assigns the power receiving apparatus DSB21 to the 3 cycles of T1, T2 and T3, and assigns the power receiving apparatus DSC22 to the 3 cycles of T4, T5 and T6 (FIG. 10I).

In S1103, the CPU 111 calculates the number of average cycles per power receiving apparatus supplied with the power from the slave power transmitting apparatus BSS11 (described as the number of slave average power supply cycles, hereinafter) by a calculation formula (2).

$$\text{The number of slave average power supply cycles} = 6/\text{the number of the power receiving apparatuses of slave power supply} \quad (2)$$

In the present embodiment, since the power receiving apparatuses supplied with the power from the slave power transmitting apparatus BSS11 are the two of the power receiving apparatus DSC22 and the power receiving apparatus DSD23, the number of slave average power supply cycles is 3 cycles according to the calculation formula (2).

In S1104, the CPU 111 assigns the power receiving apparatus DSC22 that can be supplied with the power from both of the power transmitting apparatuses BSM10 and BSS11, avoiding the individual cycles T4, T5 and T6 assigned to the master power transmitting apparatus BSM10 in S1102 among the cycles T1 to T6 of the slave power transmitting apparatus BSS11, correspondingly to the number of slave average power supply cycles calculated in S1103. In the present embodiment, the CPU 111 assigns the power receiving apparatus DSC22 to the 3 cycles of T1, T2 and T3 (FIG. 10J).

In S1105, the CPU 111 assigns the other power receiving apparatus DSD23 supplied with the power from the slave power transmitting apparatus BSS11 to the remaining individual cycles of T4, T5 and T6 of the slave power transmitting apparatus BSS11 correspondingly to the number of slave average power supply cycles calculated in S1103. In the present embodiment, the CPU 111 assigns the power receiving apparatus DSD23 to the 3 cycles of T4, T5 and T6 (FIG. 10K).

In S1106, the CPU 111 determines the time (sec.) of each of the cycles T1 to T6 (FIG. 10L). Here, the CPU 111 may determine the time (sec.) of each of the cycles T1 to T6 to be a default setting value set beforehand like 60 seconds for instance, however, the time (sec.) of each cycle is changeable by a system configuration.

By the processing described above, the CPU 111 can adjust the power supply timing among the plurality of power transmitting apparatuses by determining and managing the time-sharing power supply schedule.

Figure 13:
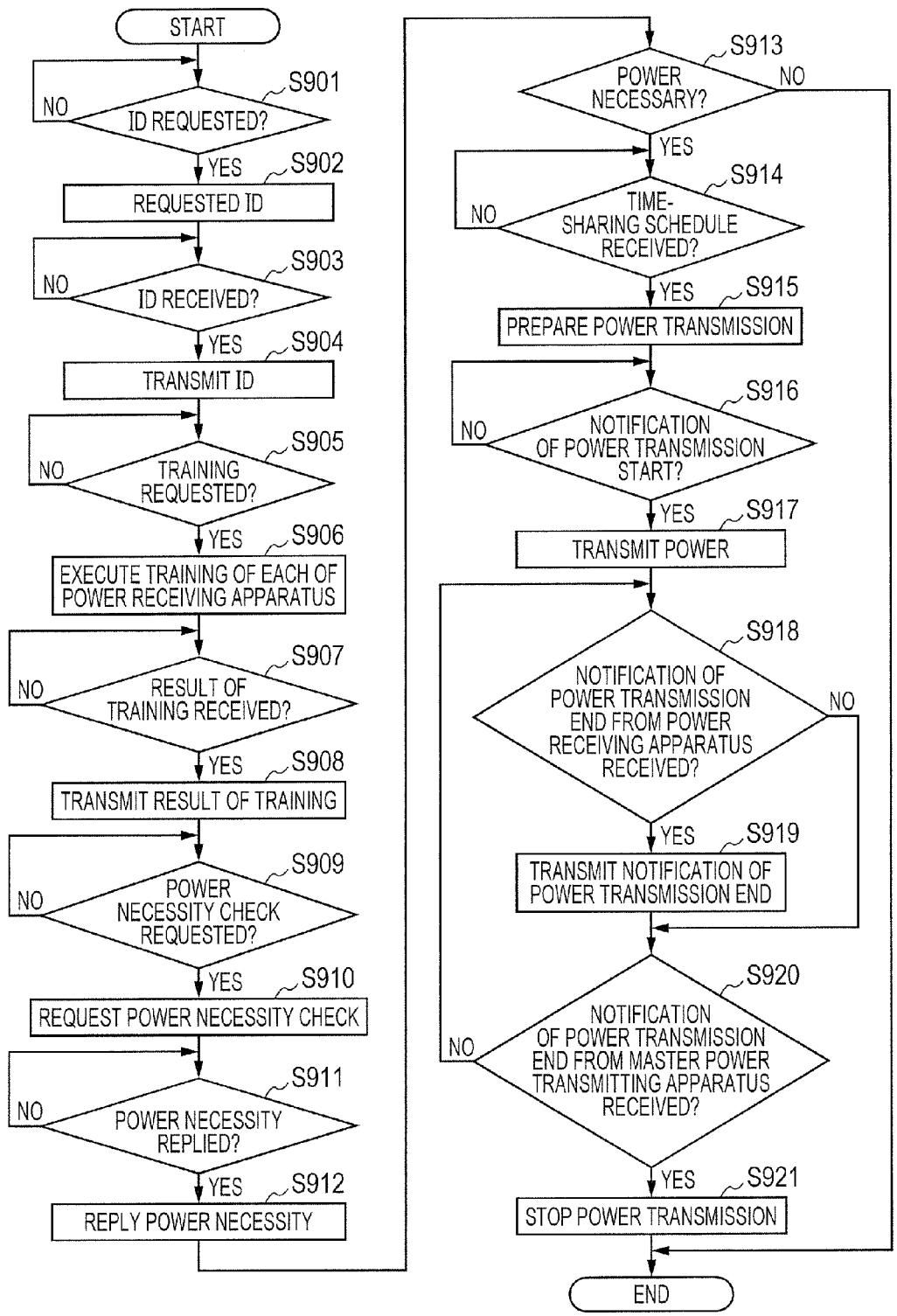
FIG. 13 is a flowchart illustrating one example of processing in a slave power transmitting apparatus.

Next, the operation of the slave power transmitting apparatus BSS11 will be described using a flowchart in FIG. 13. FIG. 13 is the flowchart illustrating one example of the processing executed by the slave power transmitting apparatus BSS11. As described above, the CPU 111 of the slave power transmitting apparatus BSS11 executes the program stored in the ROM 112 or the like and thus the processing of the flowchart in FIG. 13 is realized.

In S901, the CPU 111 receives an ID request from the master power transmitting apparatus BSM10 through the wireless reception unit (Yes in S901).

In S902, the CPU 111 requests the IDs to the individual power receiving apparatuses DSC22 and DSD23 through the wireless transmission unit 120.

In S903, the CPU 111 receives the IDs from the individual power receiving apparatuses DSC22 and DSD23 through the wireless reception unit (Yes in S903).

In S904, the CPU 111 transmits the IDs to the master power transmitting apparatus BSM10 through the wireless transmission unit 120.

In S905, the CPU 111 receives the training request from the master power transmitting apparatus BSM10 through the wireless reception unit (Yes in S905).

In S906, the CPU 111 performs training to the power receiving apparatus DSC22 and the power receiving apparatus DSD23 through the wireless transmission unit 120.

In S907, the CPU 111 receives the training results from the individual power receiving apparatuses DSC22 and DSD23 through the wireless reception unit (Yes in S907).

In S908, the CPU 111 transmits the training results to the master power transmitting apparatus BSM10 through the wireless transmission unit 120.

In S909, the CPU 111 receives a power necessity confirmation request from the master power transmitting apparatus BSM10 through the wireless reception unit (Yes in S909).

In S910, the CPU 111 confirms the necessity of the power to the individual power receiving apparatuses DSC22 and DSD23 through the wireless transmission unit 120.

In S911, the CPU 111 receives the necessity of the power from the individual power receiving apparatuses DSC22 and DSD23 through the wireless reception unit (Yes in S911).

In S912, the CPU 111 transmits the necessity of the power to the master power transmitting apparatus BSM10 through the wireless transmission unit 120.

In S913, in the case that the power is needed as a result of receiving a reply of the necessity of the power from the individual power receiving apparatuses DSC22 and DSD23, the CPU 111 advances to the processing of S914.

In S914, the CPU 111 receives the time-sharing power supply schedule from the master power transmitting apparatus BSM10 through the wireless reception unit (Yes in S914).

In S915, the CPU 111 prepares for the power transmission according to the received time-sharing power supply schedule.

In S916, the CPU 111 receives a power transmission start notice from the master power transmitting apparatus BSM10 through the wireless reception unit (Yes in S916).

In S917, the CPU 111 transmits the power according to the time-sharing power supply schedule to the individual power receiving apparatuses DSC22 and DSD23 present inside the power supply area 31 through the wireless transmission unit 120. Thus, the power supply from the power transmitting apparatus BSS11 to the individual power receiving apparatuses DSC22 and DSD23 is started.

When one of the batteries 230 of the individual power receiving apparatuses DSC22 and DSD23 becomes full, the CPU 111 receives the notice of the power transmission end from one of the power receiving apparatuses DSC22 and DSD23 through the wireless reception unit (Yes in S918).

In S919, the CPU 111 transmits the power transmission end notice to the master power transmitting apparatus BSM10 through the wireless transmission unit 120.

In S920, the CPU 111 receives the power transmission end notice from the master power transmitting apparatus BSM10 through the wireless reception unit (Yes in S920).

When the notice of the power transmission end is received, the CPU 111 stops the power transmission from the wireless transmission unit 120 to the individual power receiving apparatuses DSC22 and DSD23 (S921).

Also, when the notice of the power unnecessity is received from the individual power receiving apparatuses DSC22 and DSD23 (No in S913), the CPU 111 ends the control in FIG. 13.

By the processing described above, the slave power transmitting apparatus BSS11 can supply the power according to the time-sharing power supply schedule management table 1202 created by the master power transmitting apparatus BSM10. Thus, the slave power transmitting apparatus BSS11 can adjust the power supply timing so as not to cause the interference of the electromagnetic waves with the master power transmitting apparatus BSM10, and can supply the power to the power receiving apparatuses.

As described above, according to the present embodiment, by cooperation of the master power transmitting apparatus BSM10 and the slave power transmitting apparatus BSS11, the power supply timing is adjusted so as not to cause the interference of the electromagnetic waves and the power can be supplied to the power receiving apparatuses. Thus, in the N-to-N wireless power supply system in which the plurality of power transmitting apparatuses wirelessly supply the power to the plurality of power receiving apparatuses, the decline of the receiving power of the power receiving apparatuses can be prevented.

Embodiment 2

In the embodiment 1, when the master power transmitting apparatus BSM10 determines the time-sharing power supply schedule, it is taken into consideration only that adjustment is executed so as not to simultaneously supply the power to the same power receiving apparatus from the plurality of power transmitting apparatuses BSM10 and BSS11. Therefore, the master power transmitting apparatus BSM10 defines that the time (the number of cycles) during which the individual power transmitting apparatuses BSM10 and BSS11 supply the power to the plurality of power receiving apparatuses is the same, and determines the time-sharing power supply schedule. Accordingly, for the power receiving apparatus DSC22 supplied with the power from both of the master power transmitting apparatus BSM10 and the slave power transmitting apparatus BSS11, power receiving time is about twice as long as the power receiving time of the other power receiving apparatuses DSB21 and DSD23. As a result, a difference is generated in the power receiving time (charging time) of the batteries 230 of the individual power receiving apparatuses.

In the present embodiment, the master power transmitting apparatus BSM10 determines the time-sharing power supply schedule so as to equalize the power receiving time of the individual power receiving apparatuses.

A point that is different from the embodiment 1 in the processing executed by the master power transmitting apparatus BSM10 is only the processing of S814 in the flowchart in FIG. 11.

Figure 14:
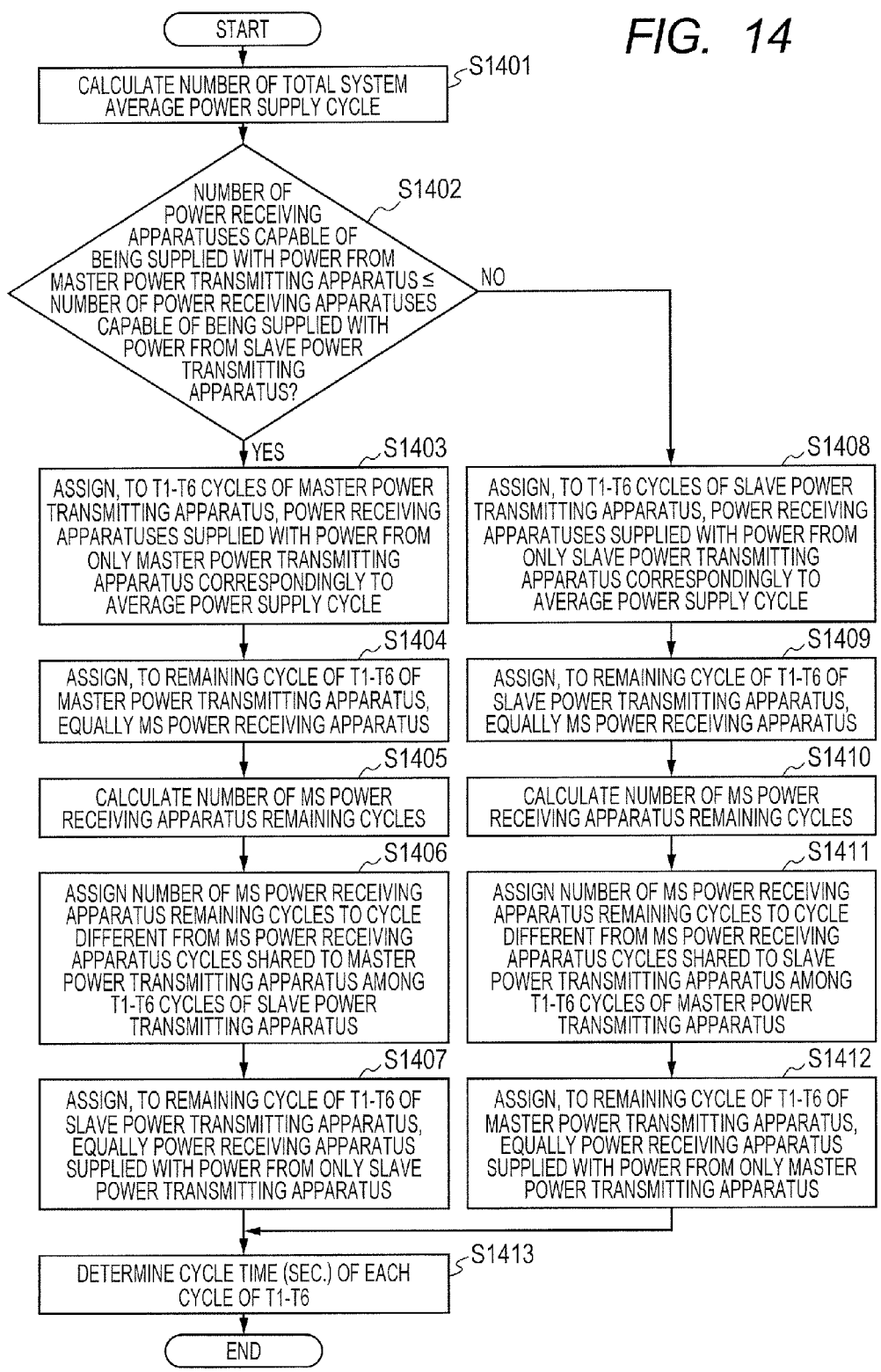
FIG. 14 is a sub flowchart (number 2) illustrating one example of the processing in the master power transmitting apparatus.

Details of the processing of determining the time-sharing power supply schedule in S814 in the present embodiment will be described using FIG. 14. FIG. 14 is a diagram illustrating one example of a sub flowchart related to the details of the processing of S814 executed by the master power transmitting apparatus BSM10 in the present embodiment. Also, together with the description of FIG. 14, the time-sharing power supply schedule management table 1202 in the present embodiment illustrated in FIGS. 15A to 15E will be also described.

In S1401, the CPU 111 calculates the number of average power supply cycles per power receiving apparatus of the entire wireless power supply system supplied with the power from the master power transmitting apparatus BSM10 and the slave power transmitting apparatus BSS11 (described as the number of total system average power supply cycles, hereinafter) by a calculation formula (3).

The number of total system average power supply cycles=the number of power transmitting apparatuses×6/the number of power receiving apparatuses (3)

In the present embodiment, since the number of the power transmitting apparatuses is 2 (BSM10, BSS11) and the number of the power receiving apparatuses is 3 (DSB21, DSC22, DSD23) as described above, the number of total system average power supply cycles is 4 cycles according to the calculation formula (3).

In S1402, the CPU 111 determines whether or not the number of the power receiving apparatuses supplied with the power from the master power transmitting apparatus BSM10 is equal to or smaller than the number of the power receiving apparatuses supplied with the power from the slave power transmitting apparatus BSS11. In S1403, the CPU 111 assigns the power receiving apparatus DSB21 supplied with the power only from the master power transmitting apparatus BSM10 to the cycles T1 to T6 of the master power transmitting apparatus BSM10 in the time-sharing power supply schedule management table 1202 only for 4 cycles as the number of total system average power supply cycles calculated in S1401 (Yes in S1402). In the present embodiment, the CPU 111 assigns the power receiving apparatus DSB21 to the 4 cycles of T1 to T4 (FIG. 15A).

In S1404, the CPU 111 equally assigns the power receiving apparatus that can be supplied with the power from both of the power transmitting apparatuses BSM10 and BSS11 (described as an MS power receiving apparatus, hereinafter) to the remaining cycles T5 and T6 of T1 to T6 in the master power transmitting apparatus BSM10. In the present embodiment, the CPU 111 assigns the power receiving apparatus DSC22 to the 2 cycles of T5 and T6 (FIG. 15B).

In S1405, the CPU 111 calculates the number of remaining cycles of the MS power receiving apparatus by a calculation formula (4).

The number of remaining cycles=the number of system average power supply cycles−the number of already assigned cycles (4)

In the present embodiment, the number of remaining cycles of the MS power receiving apparatus is 2 cycles according to the calculation formula (4). In S1406, the CPU 111 assigns the number of MS power receiving apparatus remaining cycles calculated in S1405 to the cycles different from MS power receiving apparatus cycles assigned to the master power transmitting apparatus BSM10 among the cycles T1 to T6 of the slave power transmitting apparatus BSS11. In the present embodiment, since the power receiving apparatus DSC22 is already assigned to T5 and T6, the CPU 111 assigns the remaining 2 cycles to T2 and T3 (FIG. 15C).

In S1407, the CPU 111 equally assigns the power receiving apparatus supplied with the power only from the slave power transmitting apparatus BSS11 to the individual cycles of T1, T4, T5 and T6 that are the remaining cycles of T1 to T6 of the slave power transmitting apparatus BSS11. In the present embodiment, the CPU 111 assigns the power receiving apparatus DSD23 to the 4 cycles of T1, T4, T5 and T6 (FIG. 15D).

In S1402, in the case that the number of the power receiving apparatuses supplied with the power from the master power transmitting apparatus BSM10 is not equal to or smaller than the number of the power receiving apparatuses supplied with the power from the slave power transmitting apparatus BSS11, the CPU 111 executes the processing from S1408 to S1412.

For the processing from S1408 to S1412, only the master power transmitting apparatus BSM10 and the slave power transmitting apparatus BSS11 are switched in the processing from S1403 to S1407 related to determination of the time-sharing power supply schedule. Therefore, the description will be omitted.

In S1413, the CPU 111 determines the time (sec.) of each of the cycles T1 to T6 (FIG. 15E). Since the processing of S1413 is similar to the processing of S1106 described above, detailed descriptions will be omitted.

By the processing described above, the master power transmitting apparatus BSM10 can determine the time-sharing power supply schedule so as to equalize the power receiving time among the individual power receiving apparatuses.

While the case of equalizing the power receiving time of the individual power receiving apparatuses has been described as an example in the present embodiment, the present invention is not necessarily limited thereto. For instance, the master power transmitting apparatus BSM10 may determine the time-sharing power supply schedule so as to supply the power to the individual power receiving apparatuses at a predetermined power supply ratio. More specifically, the master power transmitting apparatus BSM10 may determine the time-sharing power supply schedule so that the power receiving time of the individual power receiving apparatuses becomes a predetermined ratio.

As described above, according to the present embodiment, by the cooperation of the master power transmitting apparatus BSM10 and the slave power transmitting apparatus BSS11, the individual power receiving apparatuses can be supplied with the power equally or at the power supply ratio set beforehand while adjusting the power supply timing so as not to cause the interference of the electromagnetic waves. Thus, in the N-to-N wireless power supply system in which the plurality of power transmitting apparatuses wirelessly supply the power to the plurality of power receiving apparatuses, the decline of the receiving power of the power receiving apparatuses can be prevented, and also the power can be supplied more efficiently and flexibly.

OTHER EMBODIMENTS

As described above, according to the above-described individual embodiments, the receiving power of the power receiving apparatuses can be prevented from declining when the plurality of power transmitting apparatuses wirelessly supply the power to the plurality of power receiving apparatuses. More specifically, in the N-to-N wireless power supply system in which the plurality of power transmitting apparatuses transmit the power to the plurality of wireless power receiving apparatuses, by adjusting the power supply timing among the plurality of power transmitting apparatuses, the interference of the electromagnetic waves with each other is eliminated, and the decline of the receiving power received by the power receiving apparatuses can be prevented.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-273071, filed Dec. 27, 2013, which is hereby incorporated by reference herein in its entirety.

What is claimed is:

1. A wireless power supply system for wirelessly supplying power to an assigned power receiving apparatus, comprising:
   a processor; and
   a memory storing computer executable code that, when executed by the processor, causes the processor to function as:
   an assigning unit configured to assign, to the power receiving apparatus, a power transmitting apparatus;
   a determining unit configured to determine a power supplying schedule such that, when the assigning unit assigns, to a particular power receiving apparatus, a plurality of power transmitting apparatuses including one master power transmitting apparatus and a plurality of slave power transmitting apparatuses, the plurality of power transmitting apparatuses supply the power to the particular power receiving apparatus, not simultaneously; and
   a power transmission controlling unit configured to control a power transmission such that, according to an instruction from the master power transmitting apparatus, in a period assigned by the master power transmitting apparatus to each of the plurality of power transmitting apparatuses, the plurality of slave power transmitting apparatuses supply the power to the power receiving apparatus.

2. The wireless power supply system according to claim 1, wherein the processor further functions as:

a notifying unit configured to notify the power supplying schedule determined by the determining unit to the plurality of power transmitting apparatuses.

3. The wireless power supply system according to claim 1, wherein:
the power transmitting apparatuses supply the power to a plurality of the power receiving apparatuses assigned by the assigning unit, successively, by switching the power receiving apparatus to be supplied with the power, and
the determining unit determines a timing of the switching of the power supplying to the power receiving apparatus from the plurality of power transmitting apparatuses, so as to supply the particular power receiving apparatus, not simultaneously from the plurality of the power transmitting apparatus.

4. An assigning apparatus for assigning, to a power receiving apparatus, a power transmitting apparatus capable of wirelessly supplying power, comprising:
a processor; and
a memory storing computer executable code that, when executed by the processor, causes the processor to function as:
an assigning unit configured to assign, to the power receiving apparatus, a power transmitting apparatus;
a determining unit configured to determine a power supplying schedule such that, when the assigning unit assigns, to a particular power receiving apparatus, a plurality of power transmitting apparatuses including a master power transmitting apparatus and a plurality of slave power transmitting apparatuses, the plurality of power transmitting apparatuses supply the power to the particular power receiving apparatus, not simultaneously; and
a power transmission controlling unit configured to control a power transmission such that, according to an instruction from the master power transmitting apparatus, in a period assigned by the master power transmitting apparatus to each of the plurality of power transmitting apparatuses, the plurality of slave power transmitting apparatuses supply the power to the power receiving apparatus.

5. The assigning apparatus according to claim 4, wherein the processor further functions as:
a notifying unit configured to notify the power supplying schedule determined by the determining unit to the plurality of power transmitting apparatuses.

6. The assigning apparatus according to claim 4, wherein:
the power transmitting apparatuses supply the power to a plurality of the power receiving apparatuses assigned by the assigning unit, successively, by switching the power receiving apparatus to be supplied with the power, and
the determining unit determines a timing of the switching of the power supplying to the power receiving apparatus from the plurality of power transmitting apparatuses, so as to supply the particular power receiving apparatus, not simultaneously from the plurality of the power transmitting apparatus.

7. A method executed by a processor of a wireless power supply system of wirelessly supplying power to an assigned power receiving apparatus, comprising:
assigning, to the power receiving apparatus, a power transmitting apparatus;
determining a power supplying schedule such that, when a plurality of power transmitting apparatuses including one master power transmitting apparatus and a plurality of slave power transmitting apparatuses are assigned to a particular power receiving apparatus, the plurality of power transmitting apparatuses supply the power to the particular power receiving apparatus, not simultaneously; and
controlling a power transmission such that, according to an instruction from the master power transmitting apparatus, in a period assigned by the master power transmitting apparatus to each of the plurality of power transmitting apparatuses, the plurality of slave power transmitting apparatuses supply the power to the power receiving apparatus.

8. A non-transitory computer-readable recording medium storing a computer-readable program for operating a computer to execute a method of wirelessly supplying power to an assigned power receiving apparatus, the program comprising:
code for assigning, to the power receiving apparatus, a power transmitting apparatus;
code for determining a power supplying schedule such that, when a plurality of power transmitting apparatuses including one master power transmitting apparatus and a plurality of slave power transmitting apparatuses are assigned to a particular power receiving apparatus, the plurality of power transmitting apparatuses supply the power to the particular power receiving apparatus, not simultaneously; and
code for controlling a power transmission such that, according to an instruction from the master power transmitting apparatus, in a period assigned by the master power transmitting apparatus to each of the plurality of power transmitting apparatuses, the plurality of slave power transmitting apparatuses supply the power to the power receiving apparatus.

* * * * *